(12) United States Patent
Shi et al.

(10) Patent No.: US 10,673,619 B1
(45) Date of Patent: Jun. 2, 2020

(54) SYSTEM AND METHOD FOR DIGITAL ASSET TRANSFER

(71) Applicant: ALIBABA GROUP HOLDING LIMITED, Grand Cayman (KY)

(72) Inventors: Rubing Shi, Hangzhou (CN); Wenlong Yang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/741,979

(22) Filed: Jan. 14, 2020

Related U.S. Application Data

(63) Continuation of application No. PCT/CN2019/105402, filed on Sep. 11, 2019.

(51) Int. Cl.
*H04L 9/06* (2006.01)
*H04L 9/32* (2006.01)
*G06Q 40/04* (2012.01)

(52) U.S. Cl.
CPC .......... *H04L 9/0637* (2013.01); *G06Q 40/04* (2013.01); *H04L 9/3263* (2013.01); *H04L 2209/38* (2013.01); *H04L 2209/56* (2013.01)

(58) Field of Classification Search
CPC . H04L 9/0637; H04L 9/3263; H04L 2209/38; H04L 2209/56; G06Q 40/04
See application file for complete search history.

(56) References Cited

U.S. PATENT DOCUMENTS

| | | | |
|---|---|---|---|
| 9,965,805 B1 | 5/2018 | Winklevoss et al. | |
| 10,068,228 B1 | 9/2018 | Winklevoss et al. | |
| 10,269,009 B1 | 4/2019 | Winklevoss et al. | |
| 10,438,290 B1 | 10/2019 | Winklevoss et al. | |
| 10,505,726 B1 * | 12/2019 | Andon | H04L 9/0643 |
| 2003/0061150 A1 | 3/2003 | Kocher | |
| 2014/0224867 A1 * | 8/2014 | Werner | G06F 16/2291 235/375 |
| 2015/0332256 A1 | 11/2015 | Minor | |

(Continued)

OTHER PUBLICATIONS

Preinterview first office action for U.S. Appl. No. 16/741,951 dated Mar. 20, 2020.

(Continued)

*Primary Examiner* — Mohammed Waliullah

(74) *Attorney, Agent, or Firm* — Sheppard Mullin Richter & Hampton LLP

(57) ABSTRACT

Methods, systems, and apparatus, including computer programs encoded on computer storage media, for digital asset transfer. One of the methods includes: obtaining a request for transferring a quantity of a digital asset from a first blockchain account associated with a blockchain to a second blockchain account associated with the blockchain, wherein the request identifies a tangible asset corresponding to the digital asset; determining a blockchain contract that is deployed on the blockchain and that corresponds to the tangible asset identified in the request; generating, based on the obtained request, a blockchain transaction for transferring the quantity of the digital asset from the first blockchain account to the second blockchain account, wherein the blockchain transaction invokes the determined blockchain contract; and sending the generated blockchain transaction to a blockchain node for adding to the blockchain.

20 Claims, 23 Drawing Sheets

(56) References Cited

U.S. PATENT DOCUMENTS

| | | |
|---|---|---|
| 2017/0046651 A1 | 2/2017 | Lin et al. |
| 2017/0103391 A1 | 4/2017 | Wilson, Jr. et al. |
| 2017/0154331 A1 | 6/2017 | Voorhees |
| 2017/0178236 A1* | 6/2017 | Saigh .................... G06Q 40/04 |
| 2017/0236121 A1 | 8/2017 | Lyons et al. |
| 2018/0089760 A1 | 3/2018 | Stradling et al. |
| 2018/0137503 A1* | 5/2018 | High ................. G06Q 30/0609 |
| 2018/0165598 A1 | 6/2018 | Saxena et al. |
| 2018/0165612 A1 | 6/2018 | Saxena et al. |
| 2018/0218176 A1 | 8/2018 | Voorhees et al. |
| 2019/0013948 A1* | 1/2019 | Mercuri .................. G06F 9/542 |
| 2019/0026821 A1 | 1/2019 | Bathen et al. |
| 2019/0028276 A1 | 1/2019 | Pierce et al. |
| 2019/0034923 A1* | 1/2019 | Greco .................. H04L 9/3239 |
| 2019/0080407 A1 | 3/2019 | Molinari et al. |
| 2019/0114706 A1* | 4/2019 | Bell ..................... G06Q 40/025 |
| 2019/0130701 A1* | 5/2019 | Simons ............... G07F 17/3241 |
| 2019/0180850 A1 | 6/2019 | Shvartsman |
| 2019/0182035 A1 | 6/2019 | Chari et al. |
| 2019/0236564 A1 | 8/2019 | Cantrell et al. |
| 2019/0237176 A1* | 8/2019 | O'brien ................ G06Q 20/065 |
| 2019/0303892 A1 | 10/2019 | Yantis et al. |
| 2019/0363873 A1 | 11/2019 | Fry et al. |

OTHER PUBLICATIONS

Preinterview first office action for U.S. Appl. No. 16/742,005 dated Mar. 30, 2020.
Preinterview first office action for U.S. Appl. No. 16/742,025 dated Apr. 3, 2020.

* cited by examiner

US 10,673,619 B1

SYSTEM AND METHOD FOR DIGITAL ASSET TRANSFER

CROSS REFERENCE TO RELATED APPLICATIONS

This application is a continuation application of International Application No. PCT/CN2019/105402, filed with the China National Intellectual Property Administration (CNIPA) on Sep. 11, 2019. The entire content of the above-identified application is incorporated herein by reference.

TECHNICAL FIELD

This application generally relates to methods and devices for managing digital assets based on blockchain technology.

BACKGROUND

Ownership and trading of certain valuable assets, such as antiques, artworks, or collectibles, traditionally have been the privilege of a group of well-off members of the society. The high value of such assets and the fact that they are often physically indivisible may prevent an ordinary person from investing in such assets. Substantial knowledge may be required for one to make educated decisions regarding investment in such valuable assets, such as to discern an authentic item from a counterfeit or to assess the market value of an item. The knowledge requirement also makes investment in such valuable assets unviable for many. Furthermore, trading of the valuable assets is usually facilitated by a number of exchange institutions (e.g., auction houses). The market availability of the valuable assets and information about characteristics thereof are often released at the liking of individual exchange institutions. Transactions involving the valuable assets often highly depend on the credibility of the exchange institutions as they may have exclusive control over records of the assets and their transactions. Also, coordination among various exchange institutions may often be difficult due to a lack of communication channels.

A blockchain may comprise a growing list of records contained in linked blocks and secured by cryptographic techniques. Each block of a blockchain may contain transaction information, account information, information about one or more previous blocks, and other related information. A blockchain may be implemented in a peer-to-peer network comprising a plurality of blockchain nodes adhering to a protocol for inter-node communication, transaction or block validation, and consensus formation. Blockchain provides a way to create and maintain permanent records and make the records accessible to a plurality of parties.

SUMMARY

Various embodiments of the specification include, but are not limited to, systems, methods, and non-transitory computer readable media for digital asset transfer.

According to some embodiments, a computer-implemented method for digital asset transfer comprises obtaining a request for transferring a quantity of a digital asset from a first blockchain account associated with a blockchain to a second blockchain account associated with the blockchain, wherein the request identifies a tangible asset corresponding to the digital asset; determining a blockchain contract that is deployed on the blockchain and that corresponds to the tangible asset identified in the request; generating, based on the obtained request, a blockchain transaction for transferring the quantity of the digital asset from the first blockchain account to the second blockchain account, wherein the blockchain transaction invokes the determined blockchain contract; and sending the generated blockchain transaction to a blockchain node for adding to the blockchain.

In some embodiments, the blockchain transaction comprises an identifier associated with the blockchain contract, an identifier associated with the first blockchain account, an identifier associated with the second blockchain account, or the quantity of the digital asset to be transferred.

In some embodiments, the method further comprises, before generating the blockchain transaction, determining, based on the obtained request, one or more permissions associated with a sender of the request for transferring the digital asset and verifying that the permissions associated with the sender satisfy one or more required permissions for transferring the digital asset from the first blockchain account to the second blockchain account.

In some embodiments, the method further comprises, before generating the blockchain transaction, obtaining, from the blockchain, data associated with the first blockchain account; determining, based on the obtained data, a quantity of the digital asset in the first blockchain account; and verifying that the determined quantity of the digital asset in the first blockchain account is no less than the quantity of the digital asset to be transferred.

In some embodiments, the method further comprises, before generating the blockchain transaction, determining, based on the blockchain contract, one or more required permissions for transferring the digital asset and determining, based on the obtained request, that transferring the digital asset from the first blockchain account to the second blockchain account satisfies the one or more required permissions.

In some embodiments, the method further comprises, before generating the blockchain transaction, obtaining, from the request, a proof that an entity associated with the first blockchain account approved the transfer of the digital asset.

In some embodiments, the method further comprises, subsequent to sending the generated blockchain transaction to the blockchain node for adding to the blockchain, obtaining a request for reversing the blockchain transaction for transferring the quantity of the digital asset from the first blockchain account to the second blockchain account; generating, based on the obtained request for reversing the blockchain transaction, a blockchain transaction for transferring the quantity of the digital asset from the second blockchain account to the first blockchain account; and sending the generated blockchain transaction for transferring the quantity of the digital asset from the second blockchain account to the first blockchain account to the blockchain node for adding to the blockchain.

In some embodiments, the method further comprises, before obtaining the request for transferring the quantity of the digital asset from the first blockchain account to the second blockchain account, generating a blockchain transaction for issuing a quantity of the digital asset to the first blockchain account, wherein the blockchain transaction for issuing the digital asset invokes the blockchain contract and sending the blockchain transaction for issuing the digital asset to the blockchain node for adding to the blockchain.

In some embodiments, the method further comprises obtaining a request for buying back the transferred digital asset from the second blockchain account; generating a blockchain transaction for transferring the transferred digital asset from the second blockchain account to a buy-back blockchain account associated with the blockchain, wherein the blockchain contract comprises a restriction prohibiting transfer of the digital asset out of the buy-back blockchain account; and sending, to the blockchain node for adding to the blockchain, the blockchain transaction for transferring the transferred digital asset from the second blockchain account to the buy-back blockchain account.

In some embodiments, the method further comprises obtaining one or more blocks of the blockchain; extracting, from the obtained one or more blocks, one or more blockchain transactions invoking the blockchain contract; and determining a transaction history associated with the digital asset based on the one or more extracted blockchain transactions.

In some embodiments, the method further comprises obtaining one or more blocks of the blockchain; extracting, from the obtained one or more blocks, one or more blockchain transactions associated with the first blockchain account; and determining a transaction history associated with the first blockchain account based on the one or more extracted blockchain transactions.

In some embodiments, the method further comprises locally storing information associated with the blockchain transaction for transferring the quantity of the digital asset from the first blockchain account to the second blockchain account.

In some embodiments, the method further comprises, before generating the blockchain transaction for transferring the quantity of the digital asset from the first blockchain account to the second blockchain account, querying for any restriction placed on the first blockchain account or the second blockchain account and verifying that transferring the quantity of the digital asset from the first blockchain account to the second blockchain account is not prohibited by any restriction placed on the first blockchain account or the second blockchain account.

In some embodiments, the method further comprises, before generating the blockchain transaction for transferring the quantity of the digital asset from the first blockchain account to the second blockchain account, querying for any restriction placed on the digital asset and verifying that transferring the quantity of the digital asset from the first blockchain account to the second blockchain account is not prohibited by any restriction placed on the digital asset.

According to other embodiments, a system for digital asset transfer comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for digital asset transfer comprises a plurality of modules for performing the method of any of the preceding embodiments.

According to some embodiments, a system for digital asset transfer comprises one or more processors and one or more computer-readable memories coupled to the one or more processors and having instructions stored thereon that are executable by the one or more processors to perform operations comprising obtaining a request for transferring a quantity of a digital asset from a first blockchain account associated with a blockchain to a second blockchain account associated with the blockchain, wherein the request identifies a tangible asset corresponding to the digital asset; determining a blockchain contract that is deployed on the blockchain and that corresponds to the tangible asset identified in the request; generating, based on the obtained request, a blockchain transaction for transferring the quantity of the digital asset from the first blockchain account to the second blockchain account, wherein the blockchain transaction invokes the determined blockchain contract; and sending the generated blockchain transaction to a blockchain node for adding to the blockchain.

According to other embodiments, a non-transitory computer-readable storage medium is configured with instructions executable by one or more processors to cause the one or more processors to perform operations comprising obtaining a request for transferring a quantity of a digital asset from a first blockchain account associated with a blockchain to a second blockchain account associated with the blockchain, wherein the request identifies a tangible asset corresponding to the digital asset; determining a blockchain contract that is deployed on the blockchain and that corresponds to the tangible asset identified in the request; generating, based on the obtained request, a blockchain transaction for transferring the quantity of the digital asset from the first blockchain account to the second blockchain account, wherein the blockchain transaction invokes the determined blockchain contract; and sending the generated blockchain transaction to a blockchain node for adding to the blockchain.

According to yet other embodiments, an apparatus for digital asset transfer comprises an obtaining module for obtaining a request for transferring a quantity of a digital asset from a first blockchain account associated with a blockchain to a second blockchain account associated with the blockchain, wherein the request identifies a tangible asset corresponding to the digital asset; a determining module for determining a blockchain contract that is deployed on the blockchain and that corresponds to the tangible asset identified in the request; a generating module for generating, based on the obtained request, a blockchain transaction for transferring the quantity of the digital asset from the first blockchain account to the second blockchain account, wherein the blockchain transaction invokes the determined blockchain contract; and a sending module for sending the generated blockchain transaction to a blockchain node for adding to the blockchain.

Embodiments disclosed herein have one or more technical effects. In some embodiments, an online platform provides online services for blockchain-based digital asset management and makes such online services accessible to users via API interfaces. This allows control of operations related to digital asset management (e.g., creation, issuance, transfer, restriction, valuation of digital asset) using programming languages or protocols that may be more user-friendly than those required by the blockchain. According to some embodiments, the online platform stores records about digital assets and operations on digital assets in a blockchain maintained by a blockchain network with blockchain nodes associated with various entities related to management of digital assets. This enables orderly coordination among the entities and sharing by the entities of permanent and traceable records. In other embodiments, the online platform provides interfaces and automated software solutions for an entity to manage digital asset ownership and transactions on behalf of a plurality of other entities. The online platform also includes storage of mapping information between blockchain accounts and business accounts. This facilitates processing a large number of ownership or transaction relationships using simplified control actions as well as effective mapping of digital asset ownership to tangible asset ownership. In yet other embodiments, the online platform generates blockchain transactions invoking blockchain contracts configured to manage transfer of digital assets. The blockchain contracts are configured to enforce various rules associated with the digital asset and are permanent after being stored in a blockchain. This allows the automated transfer of digital assets by operation of a blockchain-based virtual machine supported by various independent parties and prevents manipulation of digital assets by any individual party.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Figure 1:
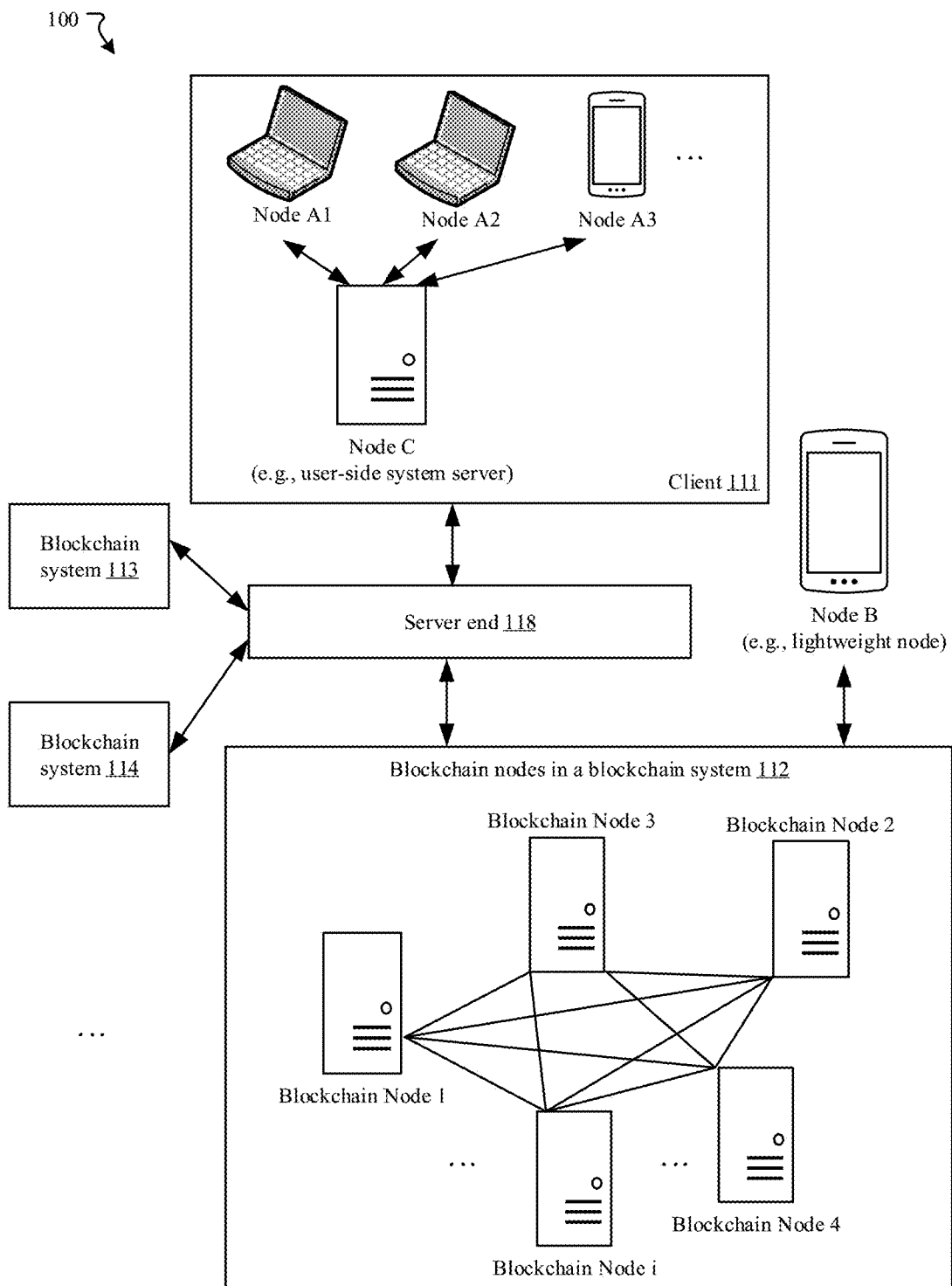
FIG. 1 illustrates a network environment associated with a blockchain in accordance with some embodiments.

Embodiments disclosed herein provide methods, systems, and apparatus associated with an ecosystem for managing digitalized representations of tangible assets (or digital assets) using blockchain technology. Some embodiments provide an online asset management platform that integrates various components, such as blockchain networks, cloud applications, client applications, key management systems, application programming interfaces, and other suitable components to enable various functionalities related to management of digital assets. The asset management platform may allow participation in the management of digital assets by various parties, such as asset exchange institutions, regulatory agencies, and asset traders or owners. Relevant parties may provide blockchain nodes to blockchain networks and participate in consensus processes of the blockchain networks and may interact with various components of the asset management platform via one or more interfaces provided by the platform.

In some embodiments, functionalities provided by the asset management platform may include creation, issuance, transfer, restriction, derestriction, valuation, as well as other suitable operations of digital assets. The digital assets may each correspond to a tangible asset and represent ownership of the tangible asset. An owner of a digital asset may therefore hold at least partial ownership rights in the corresponding tangible asset. Similarly, an owner of the entirety of a digital asset may be the owner of the underlying tangible asset and may obtain the rights to take possession of the tangible asset. Records related to the digital assets, their underlying tangible assets, and operations on the digital assets may be permanently recorded in one or more blockchains maintained by the blockchain networks and be made fully traceable, auditable, and transparent to the participants of the blockchain networks. The parties interacting with the asset management platform may be regulated using a role-based permission system, in which certain privileged operations may be limited to corresponding permission holders. For example, the creator of digital assets may be limited to institutions approved by related government regulatory entities. The institutions may be required to make various disclosures regarding the digital assets and the corresponding tangible assets (e.g., quantity, manner of issuance, authenticity, condition). The disclosures may be recorded in the blockchain as well.

Various operations related to digital assets may be accomplished by operation of one or more virtual machines running on blockchain networks and execution of blockchain contracts specifically configured to handle various functionalities related to digital assets. The operations may include, for example, issuance of digital assets, transfer of digital assets, buyback of digital assets, imposing restrictions on digital assets or accounts, removing restrictions on digital assets or accounts, valuating digital assets, other suitable operations, or any combination thereof. Various functionalities may be accomplished by accessing records stored in the blockchains, such as obtaining transaction histories associated with accounts or digital assets, monitoring and regulating trading activities, and other suitable functionalities. The asset management platform may perform one or more of the operations or functionalities in responses to inputs from external systems or automatically based on time-based conditions.

FIG. 1 illustrates a network environment associated with a blockchain in accordance with some embodiments. As shown, in the environment 100, a client 111 may couple to a server end 118, and the server end 118 and a Node B may couple to a blockchain system 112 through various communication networks. Similarly, the server end 118 may optionally couple to additional blockchain systems similar to the blockchain system 112 such as blockchain system 113, blockchain system 114, etc. Each blockchain system may maintain one or more blockchains.

In some embodiments, the client 111 may comprise one or more servers (e.g., Node C) and one or more other computing devices (e.g., Node A1, Node A2, Node A3). Node A1, Node A2, and Node A3 may couple to Node C. In some embodiments, Node C may be implemented by an entity (e.g., website, mobile phone Application, organization, company, enterprise), which has various local accounts (e.g., local accounts accessed from Node A1, Node A2, Node A3). For example, a mobile phone application may have millions of end-users accessing the application's server from respective user accounts. The application's server may correspondingly store millions of user accounts. The components of the client 111 and their arrangement may have many other configurations.

In some embodiments, Node B may include a lightweight node. A lightweight node may not download the complete blockchain but may instead just download the block headers to validate the authenticity of the blockchain transactions. Lightweight nodes may be served by and effectively dependent on full nodes (e.g., blockchain nodes in the blockchain system 112) to access more functions of the blockchain. The lightweight nodes may be implemented in electronic devices such as laptops, mobile phones, and the like by installing an appropriate software.

In some embodiments, there may be many more clients coupled to the server end 118 similar to client 111. The server end 118 may provide Blockchain-as-a-Service (BaaS) and be referred to as a BaaS cloud. In one embodiment, BaaS is a cloud service model in which clients or developers outsource behind-the-scenes aspects of a web or mobile application. BaaS may provide pre-written software for activities that take place on blockchains, such as user authentication, database management, and remote updating. The BaaS cloud may be implemented in a server, server cluster, or other devices. In one embodiment, the BaaS cloud provides an enterprise-level platform service based on blockchain technologies. This service may help clients to build a secure and stable blockchain environment as well as manage the deployment, operation, maintenance, and development of blockchain easily. Based on the abundant security strategies and multi-tenant isolation of cloud, the BaaS cloud can provide advanced security protection using chip encryption technologies. Based on highly reliable data storage, this service may provide end-to-end and highly available services that can scale up quickly without interruption. The BaaS cloud can provide native support for standard blockchain applications and data.

In some embodiments, the blockchain system 112 may comprise a plurality of blockchain nodes (e.g., Blockchain Node 1, Blockchain Node 2, Blockchain Node 3, Blockchain Node 4, Blockchain Node i, etc.) that maintain one or more blockchains (e.g., public blockchain, private blockchain, consortium blockchain). Other blockchain systems (e.g., blockchain system 113, blockchain system 114) may comprise similar arrangements of blockchain nodes maintaining other blockchains. Each blockchain node may be found in one or more blockchain systems. The blockchain nodes of each blockchain system may maintain one or more blockchains. The blockchain nodes may include full nodes. Full nodes may download every block and blockchain transaction and check them against the blockchain's consensus rules. The blockchain nodes may form a network (e.g., peer-to-peer network) with one blockchain node communicating with another. The order and the number of the blockchain nodes as shown are merely examples for illustration. The blockchain nodes may be implemented in servers, computers, etc. For example, each blockchain node may be implemented in a server or a cluster of servers. The cluster of servers may employ load balancing. Each blockchain node may correspond to one or more physical hardware devices or virtual devices coupled together via various types of communication methods such as TCP/IP. Depending on the classifications, the blockchain nodes may also be referred to as full nodes, Geth nodes, consensus nodes, etc.

In the environment 100, each of the nodes and devices may be installed with appropriate software (e.g., application programming interface) and/or hardware (e.g., wires, wireless connections) to access other devices of the environment 100. In general, the nodes and devices may be able to communicate with one another through one or more wired or wireless networks (e.g., the Internet) through which data can be communicated. Each of the nodes and devices may include one or more processors and one or more memories coupled to the one or more processors. The memories may be non-transitory and computer-readable and configured with instructions executable by one or more processors to cause the one or more processors to perform operations described herein. The instructions may be stored in the memories or downloaded over a communications network without necessarily being stored in the memories. Although the nodes and devices are shown as separate components in this figure, it will be appreciated that these nodes and devices can be implemented as single devices or multiple devices coupled together. For example, Node B may be alternatively integrated into Blockchain Node 2.

The devices such as Node A1, Node A2, Node A3, Node B, and Node C may be installed with an appropriate blockchain software to create blockchain accounts, and initiate, forward, or access blockchain transactions. The term "blockchain transaction" may refer to a unit of task executed in a blockchain system and recorded in the blockchain. For example, Node A1 may access the blockchain through communications with Node C, the server end 118, and Blockchain Node 1, and Node B may access the blockchain through communications with Blockchain Node 2. In some embodiments, Node A1 may submit a blockchain account creation request to Node C. Node C may forward the request and other similar requests to the server end 118. The server end 118 may accordingly create blockchain accounts.

In some embodiments, after receiving a blockchain transaction request of an unconfirmed blockchain transaction, a recipient blockchain node may perform some preliminary verification of the blockchain transaction. For example, Blockchain Node 1 may perform the preliminary verification after receiving a blockchain transaction from Node C. Once verified, the blockchain transaction may be stored in a database of the recipient blockchain node (e.g., Blockchain Node 1), which may also forward the blockchain transaction to one or more other blockchain nodes (e.g., Blockchain Node 3, Blockchain Node 4). As each blockchain node may comprise or couple to a memory, the database may be respectively stored in the memories of the blockchain nodes. The database may store a pool of blockchain transactions submitted by the one or more client devices. After receiving the blockchain transaction, the one or more other blockchain nodes may repeat the process done by the recipient blockchain node.

Each blockchain node may select some of the blockchain transactions from the pool according to its preference and form them into a proposed new block for the blockchain. The blockchain node may perform "mining" of the proposed new block by devoting computing power to solve complex mathematical problems. If the blockchain transaction involves a blockchain contract, the blockchain nodes may execute the blockchain contract locally in respective virtual machines (VMs). The blockchain contract may comprise instructions, code, or programs that are automatically executable by a blockchain system when one or more preset triggering conditions are met. To handle the blockchain contracts, each blockchain node of the blockchain network may run a corresponding VM and executes the same instructions in the blockchain contract. A VM is a software emulation of a computer system based on computer architectures and provide functionality of a physical computer. VM in the blockchain context can be understood as a system designed to operate as a runtime environment for blockchain contracts.

A certain blockchain node that successfully mines the proposed new block of blockchain transactions in accordance with consensus rules may pack the new block into its local copy of the blockchain and multicast the results to other blockchain nodes. The certain blockchain node may be a blockchain node that has first successfully completed the verification, that has obtained a verification privilege, or that has been chosen based on another consensus rule, etc. Then, the other blockchain nodes may follow the same order of execution performed by the certain blockchain node to locally execute the blockchain transactions in the new block, verify the execution results with one another (e.g., by performing hash calculations), and synchronize their copies of the blockchain with that of the certain blockchain node. By updating their local copies of the blockchain, the other blockchain nodes may similarly write such information in the blockchain transaction into respective local memories.

As such, the blockchain contract can be deployed on the blockchain. If the verification fails at some point, the blockchain transaction is rejected.

The deployed blockchain contract may have an address, according to which the deployed contract can be accessed. A blockchain node may invoke the deployed blockchain contract by inputting certain parameters to the blockchain contract. In one embodiment, Node C or Node B may request to invoke the deployed blockchain contract to perform various operations. For example, data stored in the deployed blockchain contract may be retrieved. For another example, data may be added to the deployed blockchain contract. For yet another example, a financial transaction specified in the deployed blockchain contract may be executed. Notwithstanding the above, other types of blockchain systems and associated consensus rules may be applied to the disclosed blockchain system.

Figure 2:
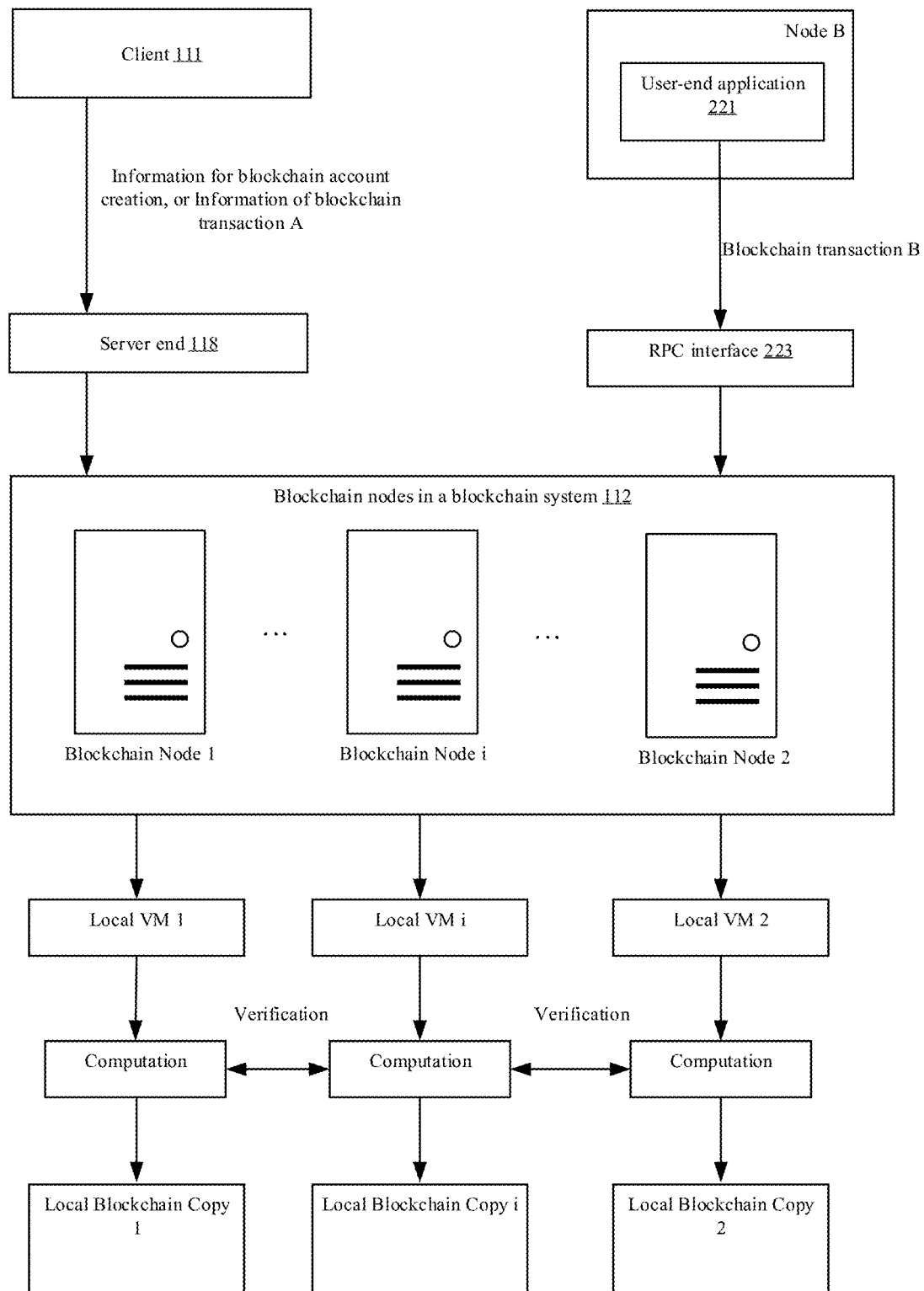
FIG. 2 illustrates a framework for implementing blockchain transactions in accordance with some embodiments.

FIG. 2 illustrates a framework for implementing blockchain transactions in accordance with some embodiments. In some embodiments, the client 111 may transmit information (e.g., a request with relevant information for creating a blockchain account) to the server end 118 for the server end 118 to create a blockchain account. To this end, the server end 118 may generate cryptography keys, compile the request with other account creation requests, and/or perform other operations. Then, the server end 118 may transmit a blockchain transaction (e.g., blockchain transaction A) including the compiled account creation requests to one or more of blockchain nodes for execution.

In some embodiments, Node B may construct a signed blockchain transaction and transmit it to one or more blockchain nodes for execution. In one embodiment, Node B may construct a blockchain transaction B. The blockchain transaction B may comprise a blockchain contract B for deployment or invoke a deployed blockchain contract. For example, the blockchain transaction B may comprise a blockchain contract that creates a blockchain account or invokes a deployed blockchain contract A. The blockchain contract B may be programmed in source code at a user-end application 221. For example, a user or machine may program the blockchain contract B. Node B may compile the source code using a corresponding compiler, which converts the source code into bytecode. The blockchain transaction B may comprise information such as nonce (e.g., transaction serial number), from (e.g., a blockchain address of Node B or another blockchain address), to (e.g., empty if deploying a blockchain contract), transaction fee, value (e.g., transaction amount), signature (e.g., signature of Node B), data (e.g., message to a contract account), etc. The Node B may send the blockchain transaction B to one or more blockchain nodes through a remote procedure call (RPC) interface 223 for execution. RPC is a protocol that a first program (e.g., user-end application) can use to request a service from a second program located in another computer on a network (e.g., blockchain node) without having to understand the network's details. When the first program causes a procedure to execute in a different address space, it is as if a normal (local) procedure call, without the programmer explicitly coding the details for the remote interaction.

In some embodiments, on receiving the blockchain transaction (e.g., blockchain transaction A or B), the recipient blockchain may verify if the blockchain transaction is valid. For example, the signature and other formats may be verified. If the verification succeeds, the recipient blockchain node may broadcast the received blockchain transaction (e.g., blockchain transaction A or B) to the blockchain network including various other blockchain nodes. Some blockchain nodes may participate in the mining process of the blockchain transactions. The blockchain transaction may be picked by a certain blockchain node for consensus verification to pack into a new block. If the blockchain transaction involves a blockchain contract, the certain blockchain node may create a contract account for a blockchain contract in association with a contract account address. If the blockchain transaction involves invoking a deployed blockchain contract, the certain blockchain node may trigger its local VM to execute the received blockchain transaction, thereby invoking the deployed blockchain contract from its local copy of the blockchain and updating the account states in the blockchain. If the certain blockchain node succeeds in mining a new block, the certain blockchain node may broadcast the new block to other blockchain nodes. The other blockchain nodes may verify the new block as mined by the certain blockchain node. If consensus is reached, the blockchain transaction B is respectively packed to the local copies of the blockchain maintained by the blockchain nodes. The blockchain nodes may similarly trigger their local VMs to execute the blockchain transaction B, thus invoking the blockchain contract A deployed on the local copies of the blockchain and making corresponding updates.

Upon receiving the new block, the other blockchain nodes may perform verifications. If a consensus is reached that the new block is valid, the new block is respectively packed to the local copies of the blockchain maintained by the blockchain nodes. The blockchain nodes may similarly trigger their local VMs (e.g., local VM 1, local VM i, local VM 2) to execute the blockchain transactions in the new block, thus invoking local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. Each time, a corresponding local VM may be triggered to execute the blockchain transaction. Likewise, all other blockchain transactions in the new block will be executed. Lightweight nodes may also synchronize to the updated blockchain.

Figure 3:
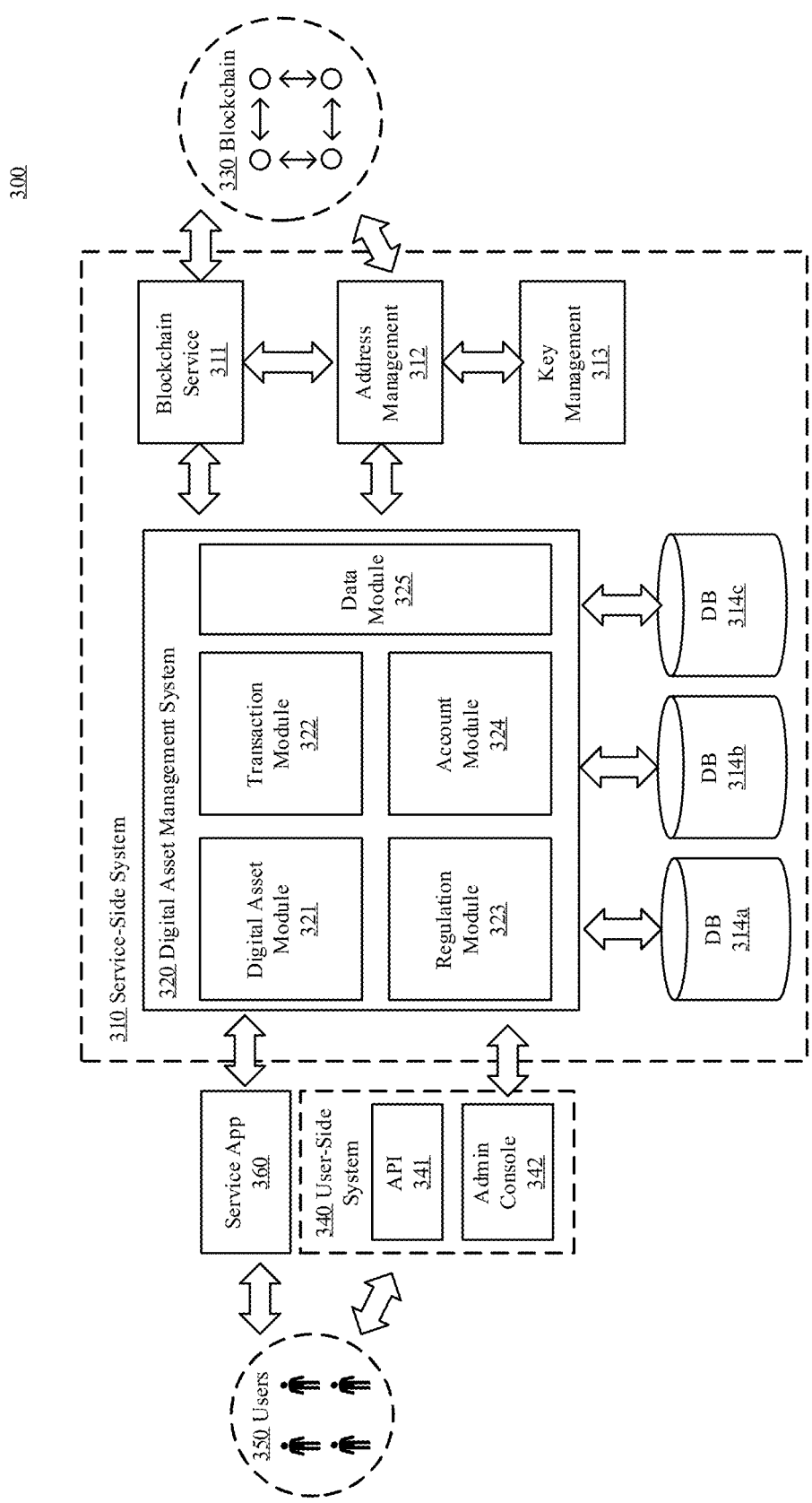
FIG. 3 illustrates a network environment associated with a system for managing digital assets in accordance with some embodiments.

FIG. 3 illustrates a network environment 300 associated with a system for managing digital assets in accordance with some embodiments. The network environment 300 may comprise a service-side system 310. The service-side system 310 may comprise various hardware components (e.g., servers, data stores, network interfaces) and various software components implemented on the hardware components. In some embodiments, the service-side system 310 as illustrated in FIG. 3 may be equivalent to, be part of, or comprise one or more components of the server end 118 as illustrated in FIGS. 1 and 2. The service-side system 310 may comprise a digital asset management system 320 configured to perform various operations related to the management of digital assets. The service-side system 310 may also comprise a blockchain service system 311, an address management system 312, a key management system (KMS) 313, and one or more data stores 314a, 314b, 314c.

In some embodiments, the service-side system 310 may interface with a blockchain system 330 using the blockchain service system 311, the address management system 312, or one or more other suitable systems. Here, although FIG. 3 illustrates a single blockchain system 330, this disclosure contemplates the service-side system 310 interacting with multiple blockchain systems 330, which are herein individually or collectively referred to as the "blockchain system 330." Each of the one or more blockchain system 330 may be equivalent to, be part of, comprise, or be substantially similar to one or more of the example blockchain systems 112, 113, and 114 as illustrated in FIGS. 1 and 2. The blockchain system 330 may comprise a decentralized network of nodes that store a ledger of records referred to as a blockchain and participate in a consensus process for adding data to the ledger of records. In some embodiments, the blockchain may comprise a public blockchain, a private blockchain, a consortium blockchain, another suitable type of blockchain, or any combination thereof. In some embodiments, the blockchain may be maintained by one or more blockchain nodes associated with asset management and exchanges. For example, one or more of the blockchain nodes may correspond to one or more asset exchange institutions, one or more asset exchange regulatory agencies, other suitable organizations, or any combination thereof. The blockchain associated with the blockchain system 330 may comprise one or more blockchain contracts. One or more of the blockchain contracts may be configured to be executed by a virtual machine associated with the blockchain system 330 to perform one or more operations associated with digital assets. The operations may comprise creating a digital asset, issuing a digital asset, transferring a digital asset, restricting or derestricting a digital asset, modifying one or more characteristics of a digital asset, other suitable operations, or any combination thereof. To interface with the blockchain system 330, the service-side system 310 may comprise one or more nodes of the blockchain system 330 and directly participate in the consensus process of the blockchain system 330 via the one or more nodes. Alternatively, the service-side system 310 may interface with the blockchain system 330 by communicating with one or more blockchain nodes of the blockchain system 330 that are controlled by other parties. The service-side system 310 may add one or more blockchain transactions to the blockchain associated with the blockchain system 330. One or more of the blockchain transactions may deploy or invoke one or more blockchain contracts on the blockchain.

In some embodiments, the network environment 300 may also comprise a user-side system 340 that may provide one or more services to a plurality of users 350 and a service application 360 that may be installed on client devices of the users 350. Here, although FIG. 3 illustrates a single user-side system 340, this disclosure contemplates the service-side system 310 interacting with multiple user-side systems 340, which are herein individually or collectively referred to as the "user-side system 340." This disclosure also contemplates multiple service applications 360 being provided to the users 350, which are herein individually or collectively referred to as the "service application 360." In some embodiments, the service application 360 may be developed or otherwise provided by a provider of the service-side system 310. The service application 360 may be installed on one or more client devices associated with one or more of the users 350. The service application 360 may provide one or more user interfaces for the users 350 to interact with one or more services provided by the service-side system 310. For example, the service application 360 may allow a user to access account information maintained by the service-side 310 system, access information associated with one or more digital assets created by the service-side system 310, subscribe to information associated with transactions related to particular accounts or digital assets, perform one or more other operations, or any combination thereof. The service application 360 may be connected to one or more computing devices associated with the service-side system 310 via one or more networks. The service application 360 may be dedicated to managing digital assets or may integrate one or more other suitable functionalities.

In some embodiments, the user-side system 340 may correspond to an entity. The entity may be a business entity that provides one or more products or services to a plurality of users 350. The entity may also be an individual user, a group of users, an organization, other suitable entities, or any combination thereof. The use-side system 340 may comprise a plurality of computer systems, data stores, cloud services, mobile applications, other suitable components, or any combination thereof. The user-side system 340 may comprise an application programming interface (API) 341 that may allow the users 350 to access one or more services provided by the user-side system 340 via API calls. The user-side system 340 may also comprise an administrative console 342 allowing control of one or more operations of the user-side system 340 by the entity associated with the user-side system 340. The administrative console 342 may be configured to control the user-side system 340 to process one or more requests from one or more users 350, to perform one or more operations in response to the requests from the users 350, to send one or more requests to the service-side system 310, to receive one or more outputs from the service-side system 310, to forward information received from the service-side system 310 to one or more of the users 350, or to perform one or more other suitable operations. In some embodiments, the user-side system 340 may store data associated with a plurality of user accounts of the users of the entity associated with the user-side system 340.

In some embodiments, the user-side system 340 may correspond to and be managed by an entity providing asset-related services, such as an exchange or auction platform for valuable assets (e.g., antiques, collectibles, artworks, consumer goods, production materials). The entity may provide a plurality of services to its users 350. The services may include, for example, storage of assets, authentication of assets, acquisition and sales of assets, listing of assets for purchase by other users, safekeeping of user funds, transfer of funds between users, conveyance of assets between users, recordkeeping for user accounts, assets, and asset transactions, other suitable services, or any combination thereof. As an example, a user 350 may own a piece of valuable artwork and may use one or more services of the entity associated with the user-side system 340 in relation to the artwork. The user 350 may apply for and open an account with the entity, which may be linked to one or more financial accounts associated with the user 350. The user 350 may trust the artwork to the entity for storage. The entity may examine the artwork, authenticate it, and provide a proof or endorsement as to its authenticity. The entity may also evaluate the condition of the artwork and provide an estimated value of the artwork. The user 350 may desire to sell the artwork and may request the entity to list the artwork for purchase. The entity may act as an agent to facilitate negotiation and transaction between the user 350 and an interested buyer. For example, after the user 350 and the buyer reach an agreement as to transfer of the artwork, the entity may simultaneously transfer money from the buyer to the user 350 and the title to the artwork from the user 350 to the buyer. The entity may provision one or more of its services via the user-side system 340. For example, the user-side system 340 may maintain a plurality of user accounts associated with a plurality of users 350, store profile and service usage information associated with the users 350 in association with the user accounts, electronically transfer funds associated with users 350, publicize a list of available assets for exchange, or provide other suitable services.

In some embodiments, the user-side system 340 may enable users 350 to use one or more services provided by service-side system 310. On behalf of the users 350, the user-side system 340 may send one or more requests to the service-side system 310 to create digital assets corresponding to tangible assets owned by the users 350. For each piece or group of tangible asset, the user-side system 340 may request the service-side system 310 to create one or more units of the digital asset, thus rendering the digital asset divisible. The user-side system 340 may maintain a mapping relationship between the digital asset and the tangible asset. The ownership of the digital asset may be mapped to ownership of the corresponding tangible asset. Thereby, an owner of the entirety of a digital asset may be deemed the owner of the tangible asset corresponding to the digital asset. The user-side system 340 may provide information associated with the tangible asset to the service-side system 310 for verification and recordation. The user-side system 340 may send requests to the service-side system 310 to effectuate one or more operations related to the digital asset, such as issuance of the digital asset, transfer of the digital asset, restriction and derestriction of the digital asset, elimination of the digital asset, other suitable operations, or any combination thereof. The user-side system 340 may also send requests to the service-side system 310 to effectuate one or more operations associated with one or more user accounts maintained by the user-side system 340, such as creation and elimination of an account for keeping digital assets (e.g., a blockchain account), account activation or deactivation, obtaining a transaction history associated with the account, transferring a digital asset into or out of the account, other suitable operations, or any combination thereof. The user-side system 340 may also obtain information from the service-side system 310, store the obtained information, or relay the information to the users 350. The information may comprise, for example, account information, transaction information, information about digital assets, other suitable information, or any combination.

The blockchain service system 311 may offer various interfaces to one or more blockchain systems 330. The blockchain service system 311 may comprise, be part of, or otherwise be associated with a blockchain-as-a-service (BaaS) cloud or other suitable cloud services. The blockchain service system 311 may receive inputs from various systems internal or external to the service-side system 310 and facilitate the creation and execution of operations such as blockchain transaction deployment, blockchain contract creation, deployment, and execution, and blockchain account creation based on the inputs. The blockchain service system 311 may also obtain information and data from one or more blockchain systems 330 and feed the information and data to one or more other systems. In some embodiments, the address management system 312 or the key management system 313 may be implemented as independent systems coupled to the blockchain service system 311. In other embodiments, the address management system 312 and the key management system 313 may be integrated as part of the blockchain service system 311 or another suitable online platform.

The address management system 312 may manage various operations related to blockchain addresses or accounts associated with the blockchain system 330. The address management system 312 may be configured to create one or more blockchain accounts, deactivate one or more blockchain accounts, store information associated with one or more blockchain accounts, perform one or more other suitable operations, or any combination thereof. In some embodiments, the service-side system 310 may receive a request from the user-side system 340 or the service application 360 for creating one or more blockchain accounts for a user 350. The request may comprise information associated with a user account associated with the user 350 that is maintained by the user-side system 340 or other user information. After the address management system 312 creates the one or more blockchain accounts for the user 350, the service-side system 310 may store a mapping relationship between the created blockchain accounts and the user accounts maintained by the user-side system 340. This may allow the service-side system 310 to identify the blockchain accounts associated with the user 350 based on information about user accounts of the user 350. In some embodiments, the address management system 312 may simultaneously create a plurality of blockchain addresses or accounts corresponding to a plurality of user accounts maintained by the user-side system 340. The plurality of blockchain addresses or accounts may be created in batches in response to a single request. Each of the created blockchain addresses or accounts may be mapped to a user-side account as described above.

In some embodiments, the KMS 313 may generate, distribute, and manage cryptographic keys for devices and applications. It may cover security aspects from secure generation of keys over the secure exchange of keys to secure key handling and storage. The functionalities of the KMS 313 may include key generation, distribution, and replacement as well as key injection, storage, and management. The KMS 313 may comprise or be coupled to a trusted execution environment (TEE). The TEE may be an isolated area on the main processor of a device that is separate from the main operating system. The TEE may provide an isolated execution environment offering security features such as isolated execution, integrity of applications executing with the TEE, along with confidentiality of their assets. It may guarantee code and data loaded inside to be protected with respect to confidentiality and integrity. In some embodiments, the KMS 313 may generate one or more cryptographic key pairs in the TEE. Before outputting the cryptographic key pair, the TEE may encrypt the private key. The encryption of the private key can be based on various methods or standards, such as Data Encryption Standard (DES), TripleDES, RSA, Advanced Encryption Standard (AES), Twofish, etc. The KMS 313 may store the encrypted private key in association with the public key. To use the private key, the KMS 313 may feed the encrypted private key to the TEE for decryption and processing.

In some embodiments, the blockchain service system 311 and the address management system 312 may call one or more functionalities of the KMS 313. As an example, the blockchain service system 311 may generate a blockchain transaction related to a blockchain account associated with the blockchain system 330. In order for the transaction to be validated by the blockchain system 330, it may be required to include a digital signature associated with the blockchain account. The blockchain service system 311 may send a request for the digital signature to the KMS 313. In response to the request, the KMS 313 may use a private key of a cryptographic key pair associated with the blockchain account to create a digital signature for the blockchain transaction and provide the digital signature to the blockchain service system 311. The blockchain service system 311 may then add the signed blockchain transaction to the blockchain associated with the blockchain system 330. As another example, the address management system 312 may need to create a new blockchain address or account. To do so, the address management system 312 may send a request to the KMS 313 for generation of a cryptographic key pair. The KMS 313 may return a public key of the cryptographic key pair to the address management system 312. The address management system 312 may generate the new blockchain address or account based on the public key returned by the KMS 313. In some embodiments, one or more other components of the service-side system 310 may call one or more functionalities of the KMS 313.

In some embodiments, the digital asset management system 320 may be configured to perform various operations related to the management of digital assets. It may comprise one or more hardware, software, or logical components including, for example, a digital asset module 321, a transaction module 322, a regulation module 323, an account module 324, a data module 325, one or more other suitable components, or any combination thereof. The digital asset management system 320 may interact with one or more other components of the service-side system 300, such as the blockchain service system 311, the address management system 312, the key management system 313, the data stores 314a, 314b, 314c. The digital asset management system 320 may also be connected to the user-side system 340, the service application 360, or one or more other external systems.

In some embodiments, the digital asset module 321 may be configured to create a digital asset, issue the digital asset to one or more user accounts, manage restrictions on the digital asset, check status of the digital asset, perform one or more other operation with respect to the digital asset, or any combination thereof. The digital asset module 321 may perform the operations based on inputs received from an external system, such as the user-side system 340. The digital asset module 321 may perform the operations in conjunction with one or more other components of the service-side system 320. For example, the digital asset module 321 may instruct the blockchain service system 311 to create one or more blockchain transactions for adding to the blockchain associated with the blockchain system 330. The blockchain transactions may be configured to, for example, deploy a blockchain contract associated with a digital asset on the blockchain, invoke a blockchain contract to trigger one or more operations of a virtual machine associated with the blockchain, perform another suitable functionality, or any combination thereof.

In some embodiments, the digital asset module 321 may receive a request for creating a digital asset from the user-side system 340. The request may comprise information associated with a tangible asset (e.g., an antique) in the possession of an entity associated with the user-side system 340. The digital asset module 321 may be configured to generate the digital asset by instructing the blockchain service system 311 to deploy a blockchain contract corresponding to the digital asset on the blockchain associated with the blockchain system 330. The digital asset module 321 may determine a quantity of the digital asset when creating the digital asset. For example, the digital asset module 321 may determine that 1000 units of a digital asset is to be created to represent one specific piece of artwork. In some embodiments, the digital asset module 321 may be configured to issue a quantity of the digital asset to one or more blockchain accounts for storing the digital asset. The digital asset module 321 may do so by instructing the blockchain service system 311 to add one or more blockchain transactions to the blockchain. The blockchain transactions may invoke the blockchain contract corresponding to the digital asset. In some embodiments, the digital asset module 321 may be configured to issue a remaining portion of the digital asset to one or more blockchain accounts. For example, the digital asset may have a total quantity of 1000 units, of which 100 units have been issued. The digital asset module 321 may be configured to issue one or more units of the remaining 900 units of the digital asset to one or more blockchain accounts. In some embodiments, the digital asset module 321 may be configured to issue an additional quantity of the digital asset to one or more blockchain accounts. For example, all of the 1000 units of the digital asset may have been issued to one or more blockchain accounts. The digital asset module 321 may create 300 additional units of the digital asset and issue the newly created units of the digital asset to one or more blockchain accounts. In some embodiments, the digital asset module 321 may query for status of a digital asset and feed the results to the user-side system 340. The status of the digital asset may comprise, for example, whether there are restrictions on the digital asset, blockchain accounts owning the digital asset, other status information, or any combination thereof. The status information of the digital asset may be obtained from the blockchain associated with the blockchain system 330 via the blockchain service system 311. In some embodiments, the digital asset module 321 may place a restriction on a digital asset or remove a restriction placed on the digital asset. In some embodiments, the digital asset module 321 may move a quantity of the digital asset from a restricted blockchain account associated with an entity to an unrestricted blockchain account associated with the entity in order to derestrict the digital asset.

In some embodiments, the transaction module 322 may be configured to effectuate one or more digital asset transactions among one or more blockchain accounts. The transactions may be initiated by the user-side system 340 on behalf of one or more of the users 350. Alternatively, the transactions may be directly initiated by a user 350 using the service application 360. The user-side system 340 may process a transaction between the user accounts associated with the user-side system 340 and provide corresponding information to the service-side system 310. The service-side system 310 may identify blockchain accounts corresponding to the user accounts based on pre-stored mapping relationships between them and transfer a quantity of a digital asset from one blockchain account to another in accordance with the transaction information from the user-side system 340. The transaction module 322 may perform the operations based on inputs received from an external system, such as the user-side system 340. The transaction module 322 may perform the operations in conjunction with one or more other components of the service-side system 310. For example, the transaction module 322 may instruct the blockchain service system 311 to create one or more blockchain transactions for adding to the blockchain associated with the blockchain system 330. The blockchain transactions may be configured to, for example, deploy a blockchain contract associated with a digital asset on the blockchain, invoke a blockchain contract to trigger one or more operations of a virtual machine associated with the blockchain, perform another suitable functionality, or any combination thereof.

In some embodiments, the transaction module 322 may be configured to issue a quantity of a digital asset to one or more blockchain accounts. The transaction module 322 may instruct the blockchain service system 311 to add one or more blockchain transactions to the blockchain associated with the blockchain system 330 to invoke a blockchain contract associated with the digital asset to issue the digital asset. The digital asset may be initially issued to a restricted blockchain account associated with the recipient of the digital asset. The transaction module 322 may later move the digital asset from the restricted blockchain account to an unrestricted blockchain account. There, the digital asset may be transferred to other blockchain accounts. In some embodiments, a portion of the digital asset may be moved from the restricted blockchain account to the unrestricted blockchain account periodically. To move the digital asset, the transaction module 322 may similarly instruct the blockchain service system 311 to generate one or more blockchain transactions and add the one or more blockchain transactions to the blockchain. In some embodiments, the transaction module 322 may be configured to transfer a quantity of a digital asset from a first blockchain account associated with a first user to a second blockchain account associated with a second user. The transaction module 322 may instruct the blockchain service system 311 to generate one or more blockchain transactions for transferring the digital asset and add the one or more blockchain transactions to the blockchain. In some embodiments, the transaction module 322 may obtain information associated with one or more digital asset transactions from the blockchain associated with the blockchain system 330 and feed the information to the user-side system 340 or the service application 360. For example, information associated with digital asset transactions may be obtained for a particular time period. As another example, information associated with a digital asset transaction may be identified and retrieved from the blockchain based on a hash value associated with the transaction. To obtain information about one or more digital asset transactions, the transaction module may obtain one or more related blocks from the blockchain using the blockchain service system 311 and extract requested transaction information from the blocks. In some embodiments, the transaction module 322 may be configured to reverse a previous transaction of digital asset in response to a request from the user-side system 340. The transaction module 322 may instruct the blockchain service system 311 to generate a blockchain transaction to transfer the digital asset in a reverse direction relative to the previous digital asset transaction.

In some embodiments, the regulation module 323 may be configured to monitor various activities associated with digital assets. The regulation module 323 may obtain information about digital asset transactions by obtaining data from the blockchain associated with the blockchain system 330 using the blockchain service system 311. Alternatively or additionally, the regulation module 323 may obtain information about digital assets directly from one or more other components of the service-side system 310. The regulation module 323 may examine the monitored activities to detect one or more security risks or violations. Alternatively, the regulation module 323 may receive reports of security risks or violations from the user-side system 340. As an example, the regulation module 323 may detect a blockchain account associated with a user 350 has engaged in risky or suspicious transactions. The regulation module 323 may freeze the blockchain account according, thus prohibiting the blockchain account from engaging in any further digital asset transactions. As another example, the regulation module 323 may detect one or more issues with a digital asset (e.g., issues with the authenticity of a tangible asset corresponding to the digital asset). The regulation module 323 may freeze the digital asset and prohibit any transaction of the digital asset. In some situations, the regulation module 323 may further force a buyback of all of the digital asset by a creator of the digital asset. In some embodiments, the regulation module may instruct the blockchain service system 311 to generate one or more blockchain transactions invoking a blockchain contract associated with a digital asset. The blockchain service system 311 may add the blockchain transactions to the blockchain, which may modify one or more parameters of the blockchain contract to freeze the digital asset. In other embodiments, the regulation module 323 may change one or more settings of the service-side system 310 to directly block any transaction requests associated with frozen accounts or frozen digital assets. In yet other embodiments, the regulation module 323 may send one or more notices to one or more blockchain nodes of the blockchain system 330 that correspond to regulatory agencies regarding suspicious activities. The blockchain nodes corresponding to regulatory agencies may then add one or more blockchain transactions to the blockchain to freeze accounts or digital assets.

In some embodiments, the account module 324 may be configured to create and maintain information associated with various types of blockchain accounts for storing digital assets. The account module 324 may instruct the address management system 312 to create blockchain accounts and relate the blockchain accounts to user accounts associated with the user-side system 340. The blockchain accounts may comprise restricted blockchain accounts, unrestricted blockchain accounts, buy-back blockchain accounts, other suitable blockchain accounts, or any combination thereof. A restricted blockchain account associated with a user 350 may not be allowed to engage in digital asset transactions with blockchain accounts associated with other users 350. A digital asset may be moved from the restricted blockchain account to an unrestricted blockchain account associated with the same user 350. The unrestricted blockchain account may engage in digital asset transactions with other blockchain accounts. A buy-back blockchain account may be created for a creator of a digital asset. At a buy-back event, all of the digital asset may be transferred to the buy-back account. The buy-back account may be prohibited from engaging in digital asset transactions that transfer the digital asset out of the buy-back account. A buy-back event may occur, for example, when a user 350 obtains all digital asset corresponding to a tangible asset and requests to redeem the tangible asset from the creator of the digital asset or when a tangible asset corresponding to a digital asset is damaged and can no longer substantiate the value of the digital asset. The account module 324 may obtain information associated with each of a plurality of blockchain accounts and store information associated with the blockchain accounts. For example, the account module 324 may store mapping relationships between blockchain accounts and user accounts maintained by the user-side system 340, digital assets in the blockchain accounts, transaction histories of the blockchain accounts, other suitable information associated with blockchain accounts, or any combination thereof. In some embodiments, the account module 324 may be configured to obtain information associated with one or more blockchain accounts from the blockchain associated with the blockchain system 330 and feed the information to the user-side system 340 or one or more users 350. The account module 324 may request data in one or more blocks of interest via the blockchain service system 311, retrieve blockchain transactions associated with one or more blockchain accounts from the blocks, filter or organize the data, and provide the data to one or more relevant users 350.

In some embodiments, the data module 325 may be configured to collect data from the blockchain associated with the blockchain system 330. The data module 325 may instruct the blockchain service system 311 to obtain one or more blocks from the blockchain, extract data associated with a plurality of blockchain transactions from the blocks, and analyze the data. For example, the data module 325 may generate various statistics associated with a digital asset (e.g., number of accounts holding the digital asset) or accounts (e.g., number of digital asset transactions associated with the account in a period of time). The data module 325 may store the obtained data and analysis results of the data in one or more data stores 314. Upon request by a user 350 via the service application 360 or the user-side system 340, the data module 325 may provide such data. Although FIG. 3 illustrates the modules 321-325, this disclosure contemplates the digital asset management system comprising one or more other suitable modules (e.g., a module for managing asset insurance information).

Figure 4:
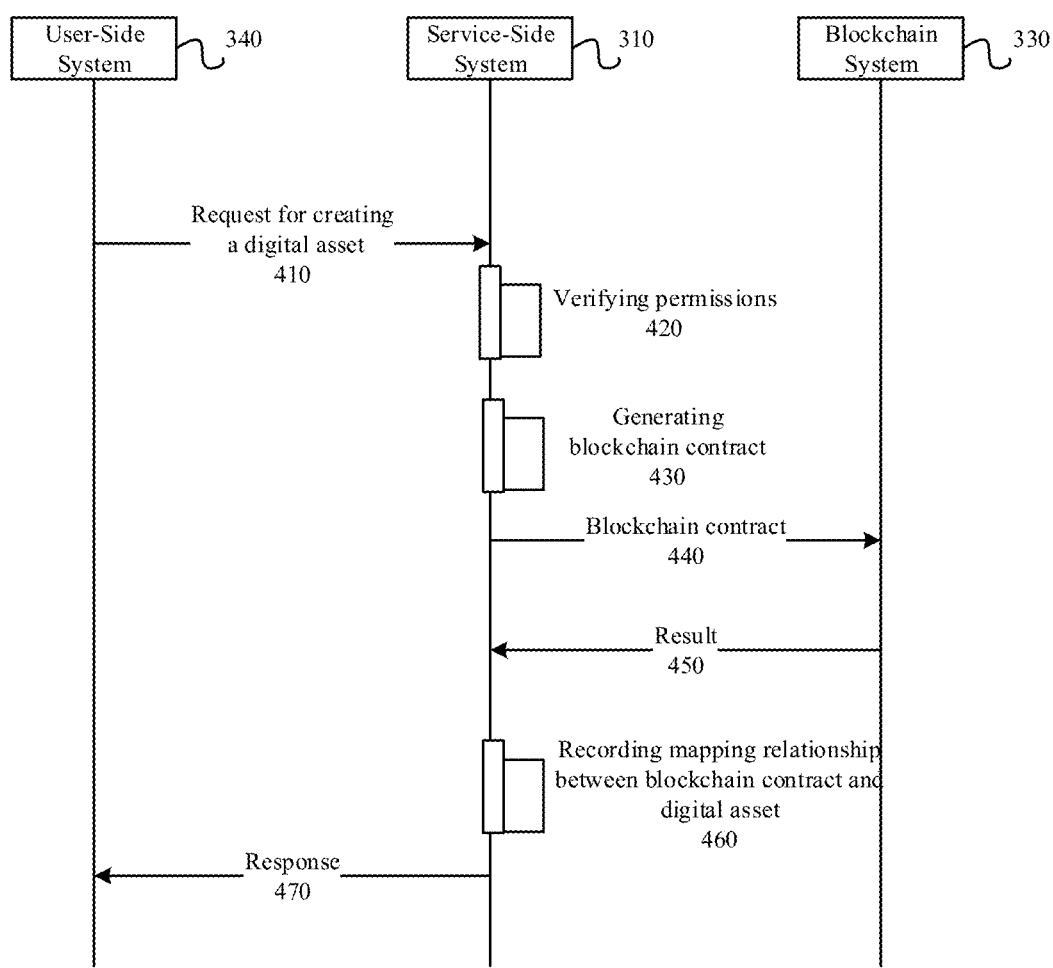
FIG. 4 illustrates a method for creating a digital asset corresponding to a tangible asset in accordance with some embodiments.

FIG. 4 illustrates a method 400 for creating a digital asset corresponding to a tangible asset in accordance with some embodiments. The operations of the method presented below are intended to be illustrative. Depending on the implementation, the method may include additional, fewer, or alternative steps performed in various orders or in parallel. The method 400 may start at step 410, in which a service-side system 310 may obtain a request for creating a digital asset corresponding to a tangible asset. The digital asset may represent a value and ownership of the tangible asset. The request may be received from a user-side system 340. For example, an entity associated with the user-side system 340 may be referred to as a creator of the digital asset. The request may comprise one or more characteristics of the digital asset. The characteristics may comprise, for example, a quantity of the digital asset, a blockchain system used to create the digital asset, one or more permissions, one or more restrictions on the digital asset, one or more other suitable characteristics of the digital asset, or any combination thereof. In some embodiments, the request for creating the digital asset may comprise a proof indicating an authenticity and a condition of the tangible asset. The proof may be provided by an entity associated with the service-side system 340. The entity may be, for example, an asset exchange company engaged in authenticating, safekeeping, and exchanging valuable tangible assets. In some embodiments, the tangible asset may be in possession of the entity associated with the service-side system 340 or the creator. The request for creating the digital asset may comprise an endorsement by the creator regarding the existence, authenticity, condition, quantity, or other aspects of the tangible asset.

At step 420, the service-side system 310 may verify that a sender of the request for creating the digital asset or the creator of the digital asset possesses one or more required permissions for creating the digital asset. The service-side system 310 may determine, based on obtained request, one or more permissions associated with a creator of the digital asset. Then, the service-side system 310 may verify that the permissions associated with the creator satisfy one or more required permissions for digital asset creation. As an example and not by way of limitation, the one or more required permissions for digital asset issuance may comprise a permission for creating digital assets for one or more types of tangible assets, a permission for creating digital assets for tangible assets of a certain value range, other suitable required permissions, or any combination thereof. The service-side system 310 may have established a trust relationship with the user-side system 340 and have obtained information associated with the user-side system 340. The service-side system 310 may have granted the user-side system 340 one or more permissions. For example, the service-side system 310 may have received and examined a license for authenticating antiques that is granted to the entity associated with the user-side system 340 by a government entity. The service-side system 310 may also have received a proof of property-loss insurance for up to one million dollars that has been purchased by the entity associated with the user-side system 340. The service-side system 310 may thereby grant the user-side system 340 permissions to issue digital assets corresponding to antiques with a value up to one million dollars. In the scenario of this example, the service-side system 310 may determine a type and an estimated value of the tangible asset associated with the request for creating the digital asset. If the tangible asset is an antique with an estimated value below one million dollars, the service-side system 310 may successfully verify that the creator possesses the required permissions for creating the digital asset. Otherwise, the service-side system 310 may determine that the creator does not possess the required permissions and may deny the request.

At step 430, the service-side system 310 may generate a blockchain contract corresponding to the tangible asset based on the one or more characteristics of the digital asset. The blockchain contract may comprise one or more properties associated with the digital asset that may be specified based on the one or more characteristics of the digital asset in the request for creating the digital asset. The one or more properties may comprise a total quantity of the digital asset, a type of the digital asset, a blockchain account associated with the digital asset's creator, a quantity of the digital asset kept in the blockchain account associated with the digital asset's creator, a date for an initial issuance of the digital asset, a quantity of the digital asset for the initial issuance of the digital asset, other suitable properties, or any combination thereof. In some embodiments, the blockchain contract may comprise software code or programs that may comprise one or more executable functions. The executable functions may comprise a function executable to issue a quantity of the digital asset to one or more blockchain accounts associated with the blockchain, a function executable to transfer a quantity of the digital asset from a first blockchain account associated with the blockchain to a second blockchain account associated with the blockchain, a function executable to set one or more restrictions on the digital asset, a function executable to remove the one or more restrictions on the digital asset, a function executable to determine whether a permission associated with the digital asset is provided, other suitable executable functions, or any combination thereof. After the blockchain contract is deployed on a blockchain, one or more blockchain transactions for managing the digital asset may invoke one or more of the executable functions.

In some embodiments, the blockchain contract may comprise one or more required permissions for one or more blockchain accounts associated with the blockchain or one or more required permissions for performing one or more operations with respect to the digital asset associated with the blockchain contract. As an example, the blockchain contract may specify that a blockchain account associated with a creator of the digital asset may be used to perform a plurality of operations with respect to the digital asset. The operations may include issuing the digital asset, transferring the digital asset, restricting the digital asset, managing derestriction of the digital asset, buying back the digital asset, or other suitable operations. A transaction signed by a cryptographic key associated with the blockchain account of the creator may be capable of triggering the executable functions of the blockchain contract corresponding to these operations. As another example, the blockchain contract may specify that a blockchain account associated with a regular user 350 may be used to transfer any unrestricted digital asset in the blockchain account. A transaction signed by a cryptographic key associated with the blockchain account of the regular user 350 may be capable of triggering the executable function of the blockchain contract corresponding to the digital asset transfer operation. The service-side system 310 may store the permissions comprised by the blockchain contract. Based on such information, the service-side system 310 may preemptively determine whether a blockchain transaction request is associated with a blockchain account with sufficient permissions and reject any such request that does not satisfy the permission requirements.

At step 440, the service-side system 310 may deploy the generated blockchain contract on a blockchain. The blockchain may be associated with and maintained by the blockchain system 330. The deployed blockchain contract may be executable (e.g., by a virtual machine associated with the blockchain system 330) to issue the digital asset corresponding to the tangible asset. To deploy the generated blockchain contract on the blockchain, the service-side system 310 may generate a blockchain transaction comprising the generated blockchain contract and send the blockchain transaction to a blockchain node for adding to the blockchain. In some embodiments, the blockchain transaction for deploying the blockchain contract may comprise information associated with the tangible asset corresponding to the digital asset. The information may comprise an identifier of the tangible asset, a valuation of the tangible asset, a timeframe associated with creation of the tangible asset, a characteristic of the tangible asset, a quantity of the tangible asset, other suitable information, or any combination thereof. In this manner, the information associated with the tangible asset may be permanently recorded in the blockchain and thus be made accessible to one or more systems with access to the blockchain (e.g., one or more blockchain nodes of the blockchain system 330).

At step 450, the service-side system 310 may obtain, from the blockchain system 330, a result of the deployment of the blockchain contract. For example, the service-side system 310 may obtain a current state of the blockchain that has been confirmed by a consensus process of the blockchain system 330 and determine whether the deployed blockchain contract has been stored in the blockchain. If so, the service-side system 310 may determine what the blockchain contract associated with the digital asset has been successfully deployed and that the digital asset has been successfully created.

At step 460, the service-side system 310 may record a mapping relationship between the deployed blockchain contract and the digital asset. The service-side system 310 may further locally store information associated with the tangible asset in correspondence with information associated with the deployed blockchain contract. In this manner, the service-side system 310 may identify a digital asset or its corresponding blockchain contract based on information associated with a tangible asset that may be received from the user-side system 340. Similarly, the service-side system 310 may obtain information associated with the digital asset (e.g., one or more transactions invoking the blockchain contract corresponding to the digital asset) and identify the tangible asset to which the obtained information is related.

At step 470, the service-side system 310 may return a response to the user-side system 340 confirming that the requested digital asset has been successfully created. The response may comprise information associated with the digital asset, which may comprise, for example, a blockchain on which the digital asset is created, a total quantity of the digital asset, an address associated with the blockchain contract corresponding to the digital asset, other suitable information, or any combination thereof.

In some embodiments, the blockchain contract corresponding to the digital asset may comprise one or more parameters that may be modifiable. The service-side system 310 may generate a blockchain transaction for modifying one or more of the one or more properties (e.g., total quantity, type) associated with the digital asset and send the blockchain transaction to a blockchain node for adding to the blockchain. The blockchain transaction may invoke the deployed blockchain contract to modify one or more parameters corresponding to the one or more properties associated with the digital asset.

Figure 5:
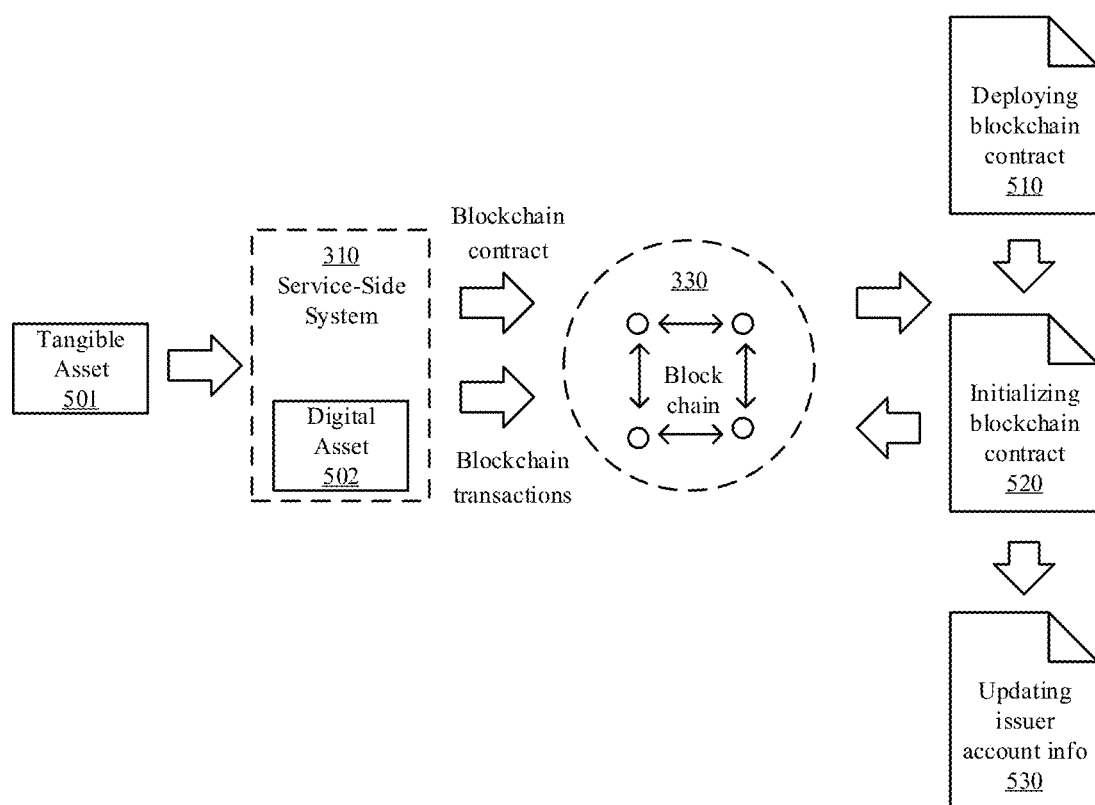
FIG. 5 illustrates operations for creating a digital asset performed by a system for managing digital assets in accordance with some embodiments.

FIG. 5 illustrates operations for creating a digital asset performed by a system for managing digital assets in accordance with some embodiments. In some embodiments, a service-side system 310 may receive information associated with a tangible asset 501. The information may be included in a request for creating a corresponding digital asset 502. The information associated with the tangible asset 501 may comprise, for example, a type of the tangible asset 501, a quantity of the tangible asset 501, a condition of the tangible asset 501, other suitable information, or any combination thereof. In response to the request, the service-side system 310 may generate the digital asset 502 that represents the value and ownership of the tangible asset 501. The service-side system 310 may generate a blockchain contract corresponding to the digital asset 502 and various blockchain transactions associated with the creation of the digital asset 502. The service-side system 310 may add the blockchain transactions to a blockchain maintained by the blockchain system 330. The blockchain transactions may effectuate operation 510, which may correspond to deploying the blockchain contract, operation 520, which may correspond to initializing the blockchain contract, and operation 530, which may correspond to updating account information of a creator of the digital asset 502. The operations 510, 520, and 530 may be performed by a virtual machine associated with the blockchain system 330 executing the blockchain contract corresponding to the digital asset 502.

Various information may be originally included in the blockchain contract when the blockchain contract is deployed to the blockchain at operation 510 or be added to the blockchain contract when it is initialized at operation 520. The information may comprise executable code corresponding to one or more operations on the digital asset 502, one or more restrictions on the digital asset 502, information associated with the tangible asset 501 (e.g., estimated value, year of creation, properties), a total quantity of the digital asset 502, a quantity of the digital asset 502 to be issued, a quantity of the digital asset 502 to be kept in a blockchain account associated with the creator of the digital asset, a quantity of the digital asset 502 to be circulated, a portion of the digital asset 502 to be derestricted, other suitable information, or any combination thereof. The account information updated at operation 530 may comprise one or more blockchain addresses or accounts associated with the creator of the digital asset 502. The one or more blockchain accounts may comprise a restricted blockchain account for the creator to keep a portion of the total quantity of the digital asset 502, an unrestricted blockchain account for the creator to participate in transactions of the digital asset 502 with other users 350, and a buy-back blockchain account for the creator to buy back the digital asset 502 from other users 350. The blockchain accounts for the creator may be different from one or more blockchain accounts associated with a regular user 350. For example, a regular user 350 may not have a buy-back blockchain account but may only have a restricted blockchain account or unrestricted blockchain account configured to keep the digital asset 502.

Figure 6:
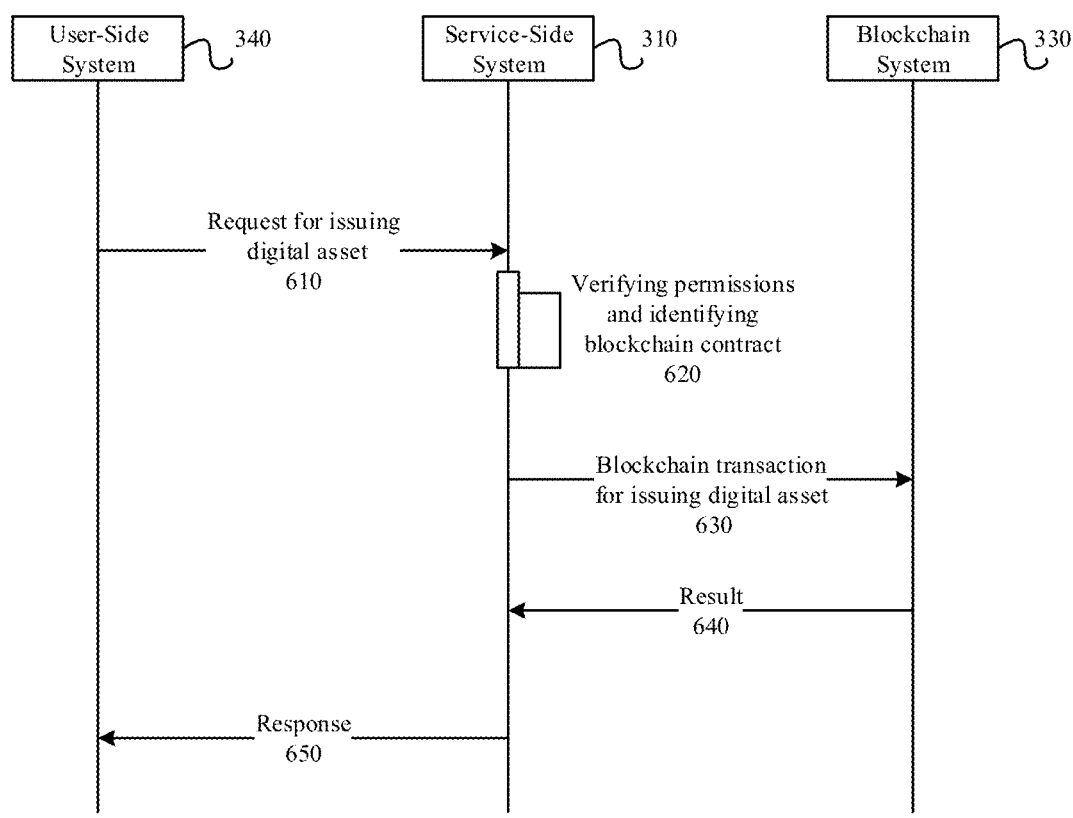
FIG. 6 illustrates a method for issuing a quantity of a digital asset to one or more blockchain accounts in accordance with some embodiments.

FIG. 6 illustrates a method 600 for issuing a quantity of a digital asset to one or more blockchain accounts in accordance with some embodiments. The operations of the method presented below are intended to be illustrative. Depending on the implementation, the method may include additional, fewer, or alternative steps performed in various orders or in parallel. The method 600 may start at step 610, in which a service-side system 310 may receive, from a user-side system 340, a request for issuing a quantity of a digital asset to one or more blockchain accounts associated with a blockchain maintained by a blockchain system 330. In some embodiments, one or more of the blockchain accounts may be associated with the one or more wholesalers or distributors of the digital asset. To send the request for issuing the digital asset, the user-side system 340 may have entered into agreements or completed transactions with the entities associated with the blockchain accounts. In some embodiments, the request for issuing the digital asset may comprise an identifier (e.g., blockchain address) associated with each of the one or more blockchain accounts, a quantity of the digital asset to be issued to each of the one or more blockchain accounts, one or more derestricting conditions associated with each of the one or more blockchain accounts, other suitable information, or any combination thereof.

At step 620, the service-side system 310 may verify that a sender of the request for issuing the digital asset possesses one or more required permissions. As an example, the service-side system 310 may permit a creator of the digital asset or a system that initiated the creation of the digital asset to make this request. The service-side system 310 may thereby verify that the request is received from the creator of the digital asset. At step 620, the service-side system 310 may further identify a blockchain contract corresponding to the digital asset. If the verification of the permissions is successful, the service-side system 310 may proceed to step 630. Otherwise, the service-side system 310 may reject the request for issuing the digital asset.

At step 630, the service-side system 310 may generate one or more blockchain transactions for issuing the quantity of the digital asset to the one or more blockchain accounts associated with the blockchain. The one or more blockchain transactions may invoke the blockchain contract corresponding to the digital asset that is identified at step 620. At step 630, the service-side system 310 may further send the one or more blockchain transactions to a blockchain node associated with the blockchain system 330 for adding to the blockchain. In some embodiments, the service-side system 310 may verify compliance with one or more properties of the blockchain contract corresponding to the digital asset. The requested issuance of the digital asset may be an initial issuance of the digital asset, an issuance of a remaining portion of the digital asset, an issuance of additional units of the digital asset, another suitable type of issuance, or any combination thereof. For example, in case of an initial issuance, the quantity of the digital asset to be issued may be required to be smaller than or equal to a quantity of the digital asset for initial issuance of the digital asset. The service-side system 310 may determine the quantity of the digital asset for issuing based on the request. Then, the service-side system 310 may verify that the determined quantity is no greater than a quantity of the digital asset for initial issuance. The quantity of the digital asset for initial issuance may be stored in association with the blockchain contract in the blockchain.

At step 640, the service-side system 310 may obtain, from the blockchain system 330, a result of the blockchain transactions for issuing the digital asset. For example, the service-side system 310 may obtain a current state of the blockchain that has been confirmed by a consensus process of the blockchain system 330 and determine whether the blockchain contract has been stored in the blockchain. As another example, the service-side system 310 may determine a quantity of the digital asset stored in each of the one or more blockchain accounts and verify that the quantity is consistent with an expected quantity after the requested issuance of the digital asset. At step 650, the service-side system 310 may return a request to the user-side system 340 confirming successful issuance of the digital asset.

In some embodiments, the digital asset may be issued to a restricted blockchain account associated with a user 350. The digital asset issued in this manner may not be immediately transferable from the restricted blockchain account but needs to be derestricted before transferred. In some embodiments, the service-side system 310 may locally store information associated with the blockchain transaction for issuing the digital asset to the restricted blockchain account. The service-side system 310 may also locally store one or more derestriction conditions in correspondence with information associated with the restricted blockchain account. For example, the locally stored one or more derestriction conditions may comprise a time schedule for derestricting the digital asset. The service-side system 310 may later perform one or more operations to derestrict the digital asset.

Figure 7:
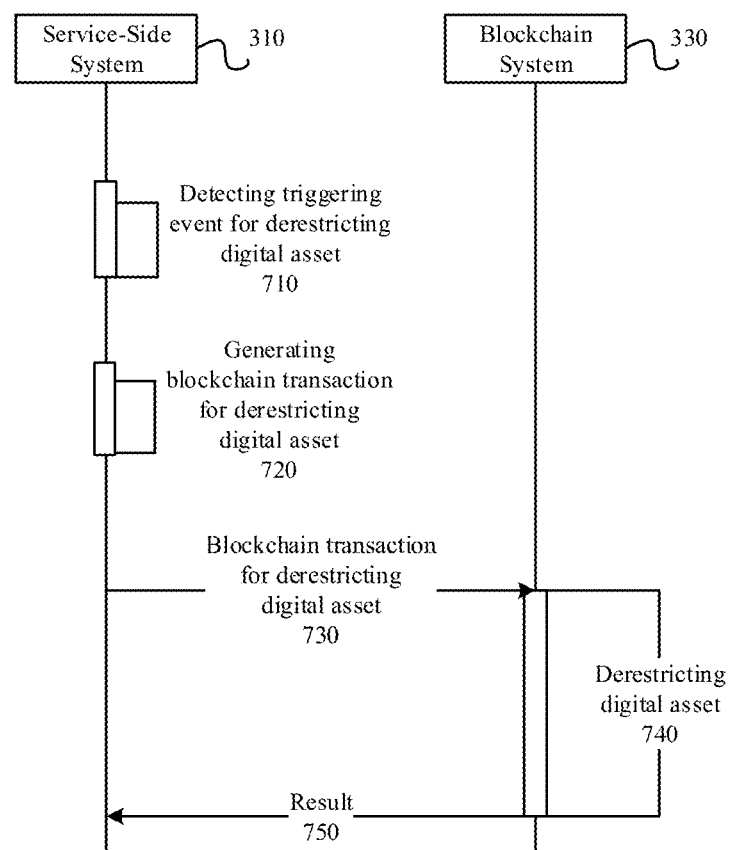
FIG. 7 illustrates a method for derestricting a quantity of a digital asset in accordance with some embodiments.

FIG. 7 illustrates a method 700 for derestricting a quantity of a digital asset in accordance with some embodiments. The operations of the method presented below are intended to be illustrative. Depending on the implementation, the method may include additional, fewer, or alternative steps performed in various orders or in parallel. In some embodiments, the method 700 may occur subsequent to the issuance of a quantity of digital asset to a restricted blockchain account associated with a user. The service-side system 310 may derestrict part of or the entirety of a digital asset in the restricted blockchain account. The method 700 may start at step 710, in which the service-side system 310 may detect a triggering event for derestricting a quantity of a digital asset associated with a tangible asset. The tangible asset may correspond to a blockchain contract deployed on a blockchain maintained by the blockchain system 330. The digital asset may be created based on the blockchain contract and be representative of the value and ownership of the tangible asset.

In some embodiments, the triggering event may comprise a request for derestricting the digital asset. To detect the trigging event, the service-side system 310 may obtain a request for derestricting the quantity of the digital asset. For example, the request may have been sent by the user-side system 340. The service-side system 310 may determine, based on the request, one or more permissions associated with a sender of the request and verify that the one or more permissions associated with the sender satisfy one or more required permissions for derestricting the quantity of the digital asset. In some embodiments, the service-side system 310 may grant, to a creator of the digital asset, one or more permissions to derestrict the digital asset. The service-side system 310 may determine whether the request for derestricting the digital asset is received from the creator. If so, the service-side system 310 may proceed to step 720. Otherwise, the service-side system 310 may reject the request.

In other embodiments, the triggering event may comprise satisfaction of a time-based condition. To detect the triggering event, the service-side system 310 may determine, based on a current time, that a time-based condition is met. As an example, the service-side system 310 may store one or more derestriction conditions when issuing the digital asset to a restricted blockchain account. The derestriction conditions may comprise a time schedule for derestricting the digital asset. The service-side system 310 may detect the triggering event by determining that a point of time specified in the time schedule is the current time.

In some embodiments, one or more derestriction conditions may specify periodical derestriction of a digital asset. As an example, the derestriction conditions may specify that a certain quantity of a digital asset is to be derestricted daily. As another example, the derestriction conditions may specify that a percentage of a digital asset in a blockchain account is to be derestricted once a month. Accordingly, the service-side system 310 may collectively process derestriction for a plurality of blockchain accounts at a certain of a day or other suitable time period. The service-side system 310 may obtain, at a pre-scheduled point of time, a plurality of conditions for derestricting a plurality of digital assets. The service-side system 310 may determine that one or more of the obtained conditions are met. Then, the service-side system 310 may proceed to derestrict one or more digital assets corresponding to the one or more of the obtained conditions.

In response to detecting the triggering event, the service-side system 310 may proceed to derestrict the quantity of the digital asset. At step 720, the service-side system 310 may generate a blockchain transaction for transferring the quantity of the digital asset from a restricted blockchain account associated with the blockchain to an unrestricted blockchain account associated with the blockchain. The blockchain transaction may invoke the blockchain contract corresponding to the tangible asset that is represented by the digital asset. In some embodiments, the blockchain transaction may comprise an identifier associated with the blockchain contract, an identifier associated with the restricted blockchain account, an identifier associated with the unrestricted blockchain account, the quantity of the digital asset to be derestricted, other suitable information, or any combination thereof. In some embodiments, the quantity of the digital asset to be derestricted may be a portion of the entirety of the digital asset in the restricted blockchain account. In this case, the service-side system 310 may determining a quantity of the digital asset in the restricted blockchain account and determining the quantity of the digital asset to be derestricted as a preset portion (e.g., 10%) of the determined quantity of the digital asset in the restricted blockchain account. Then, the service-side system 310 may include this determined quantity of the digital asset to be derestricted in the blockchain transaction. In some embodiments, the service-side system 310 may collectively process derestriction of digital assets in a plurality of blockchain accounts with one blockchain transaction. In this case, the blockchain transaction may comprise a transfer of a plurality of digital assets from a plurality of restricted blockchain accounts to a plurality of unrestricted blockchain accounts.

At step 730, the service-side system 310 may send the blockchain transaction for derestricting the digital asset to a blockchain node associated with the blockchain system 330 for adding to the blockchain. At step 740, the blockchain transaction may cause execution of the blockchain contract associated with the digital asset by a virtual machine associated with the blockchain system 330. The virtual machine may execute a function of the blockchain contract for transferring the digital asset to transfer the quantity of the digital asset from the restricted blockchain account to the unrestricted blockchain account. At step 750, the service-side system 310 may obtain, from the blockchain system 330, a result of the blockchain transaction for derestricting the digital asset. For example, the service-side system 310 may obtain a current state of the blockchain that has been confirmed by a consensus process of the blockchain system 330 and determine a quantity of the digital asset in the unrestricted blockchain account and a quantity of the digital asset in the restricted blockchain account.

Figure 8:
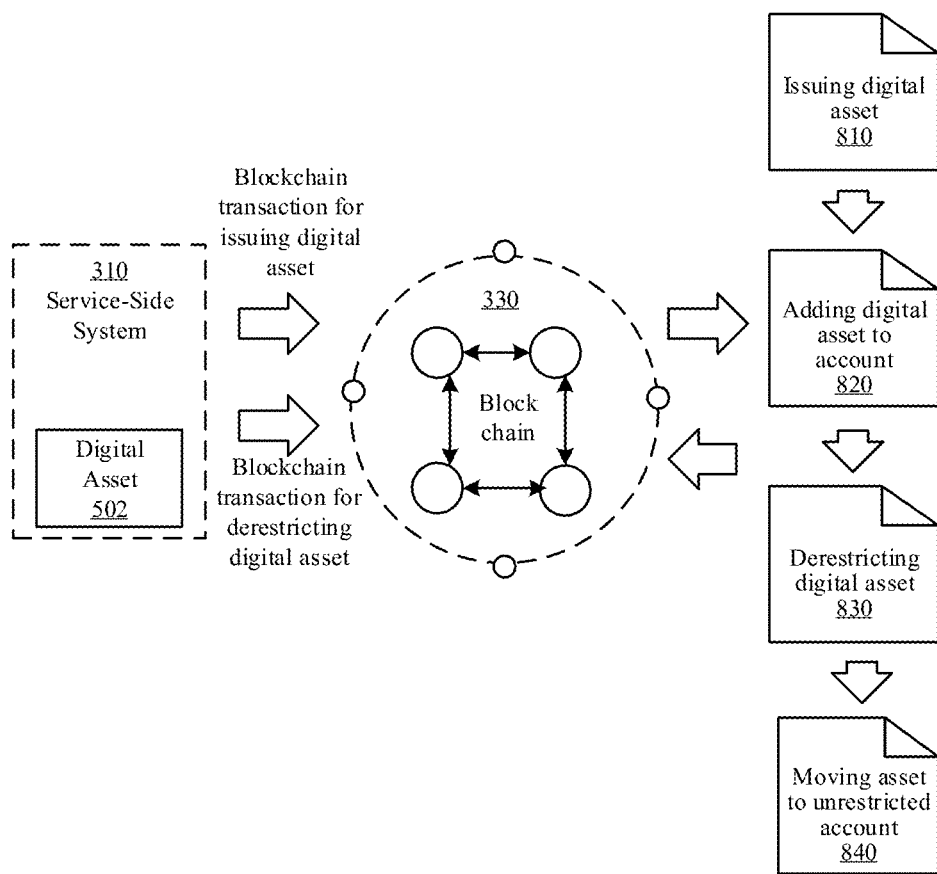
FIG. 8 illustrates operations for issuing and derestricting a digital asset performed by a system for managing digital assets in accordance with some embodiments.

FIG. 8 illustrates operations for issuing and derestricting a digital asset performed by a system for managing digital assets in accordance with some embodiments. In some embodiments, a service-side system 310 may have created a digital asset 502. The digital asset 502 may have been created by deploying a corresponding blockchain contract on a blockchain maintained by the blockchain system 330. The service-side system 310 may issue a quantity of the digital asset to a restricted blockchain account and then derestrict the digital asset. The service-side system 310 may generate one or more blockchain transactions for issuing the digital asset and one or more blockchain transactions for derestricting the digital asset and add the blockchain transactions to the blockchain. The blockchain transactions may effectuate operation 810, which may correspond to executing the blockchain contract to issue the quantity of the digital asset; operation 820, which may correspond to adding the issued digital asset to a restricted blockchain account associated with a user 350; operation 830, which may correspond to derestricting a portion of the digital asset in the restricted blockchain account (e.g., periodically); and operation 840, which may correspond to moving the digital asset from the restricted blockchain account associated with the user 350 to an unrestricted blockchain account associated with the user 350. The operations 810, 820, 830, and 840 may be performed by a virtual machine associated with the blockchain system 330 executing the blockchain contract associated with the digital asset 502.

Figure 9:
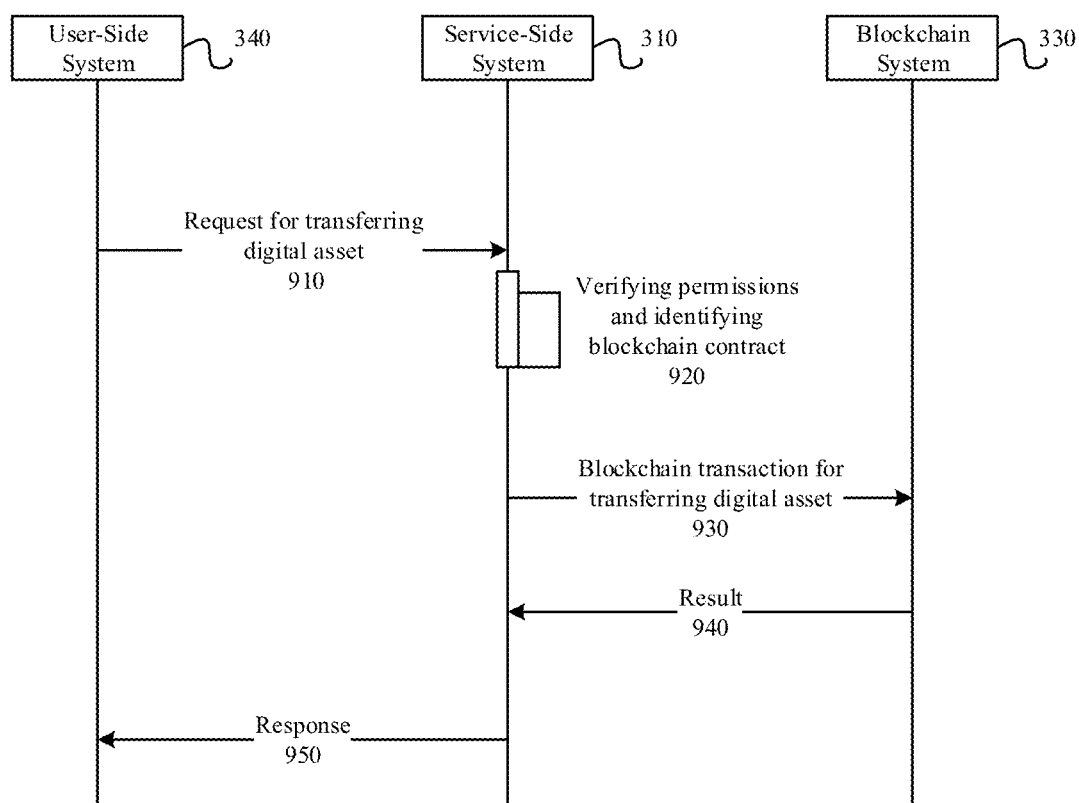
FIG. 9 illustrates a method for transferring a quantity of a digital asset from one blockchain account to another in accordance with some embodiments.

FIG. 9 illustrates a method 900 for transferring a quantity of a digital asset from one blockchain account to another in accordance with some embodiments. The operations of the method presented below are intended to be illustrative. Depending on the implementation, the method may include additional, fewer, or alternative steps performed in various orders or in parallel. In some embodiments, the method 900 may occur subsequent to issuance of a quantity of digital asset to a blockchain account associated with a user 350 and derestriction of the digital asset. After the digital asset is moved to an unrestricted blockchain account associated with the user 350, the user 350 may be allowed to transfer the digital asset from the unrestricted blockchain account to a blockchain account associated with another user 350. The method 900 may start at step 910, in which the service-side system 310 may obtain a request for transferring a quantity of a digital asset from a first blockchain account associated with a blockchain to a second blockchain account associated with the blockchain. The blockchain may be one maintained by the blockchain system 330. In some embodiments, the request may identify a tangible asset corresponding to the digital asset to be transferred. In some embodiments, a user 350 owning the digital asset may initiate a transaction involving the digital asset at a user-side system 340. The user-side system 340 may generate and send the request for transferring the digital asset to the service-side system 310 according to the transaction of the user 350. In some embodiments, a user 350 owning the digital asset may directly use a service application 360 to send the request for transferring the digital asset to the service-side system 310.

At step 920, the service-side system 310 may determine a blockchain contract that is deployed on the blockchain and that corresponds to the tangible asset identified in the request. The blockchain contract may have been deployed on the blockchain to create the digital asset to be transferred. At step 920, the service-side system 310 may also determine whether a sender of the request for transferring the digital asset possesses required permissions for initiating the transfer of the digital asset. The service-side system 310 may determine, based on the obtained request, one or more permissions associated with a sender of the request for transferring the digital asset. Then, the service-side system 310 may verify that the permissions associated with the sender satisfy one or more required permissions for transferring the digital asset from the first blockchain account to the second blockchain account. For example, the service-side system 310 may grant one or more permissions for transferring the digital asset from the first blockchain account to an owner of the first blockchain account or an authorized controller of the first blockchain account. A user 350 associated with the first blockchain account may be treated as the owner of the first blockchain account and be granted the one or more permissions. The user-side system 340 may have created the first blockchain account on behalf of the user 350 and may be treated as an authorized controller of the first blockchain account. The user-side system 340 may thus also be given the one or more permissions required to transfer the digital asset from the first blockchain account. If the service-side system 310 determines that the sender of the request for transferring the digital asset possesses the required permissions, the service-side system 310 may proceed to step 930. Otherwise, the service-side system 310 may reject the request.

In some embodiments, the service-side system 310 may require that the owner of the digital asset to be transferred approves the transfer of such digital asset. The service-side system may obtain, from the request, a proof that an entity associated with the first blockchain account approved the transfer of the digital asset. To obtain such a proof, the user-side system 340 may have processed a payment for purchasing the digital asset from a payment account of a user 350 associated with the second blockchain account to a payment account of a user 350 associated with the first blockchain account. If the request does comprise such a proof, the service-side system 310 may proceed to step 930. Otherwise, the service-side system 310 may reject the request.

In some embodiments, the service-side system 310 may verify satisfaction of one or more other conditions before proceeding to transfer the digital asset in response to the request. As an example, the service-side system 310 may verify that the quantity of the digital asset in the first blockchain account is sufficient for the transfer. The service-side system 310 may obtain data associated with the first blockchain account from the blockchain maintained by the blockchain system 330. Based on the obtained data, the service-side system may determine a quantity of the digital asset in the first blockchain account and verify that the determined quantity of the digital asset in the first blockchain account is no less than the quantity of the digital asset to be transferred. If the verification is successful, the service-side system 310 may proceed to transfer the digital asset. Otherwise, the service-side system 310 may reject the request.

As another example, the service-side system 310 may verify that one or more conditions required for transferring the digital asset are met. The service-side system 310 may determining one or more required permissions for transferring the digital asset based on the blockchain contract associated with the digital asset. The service-side system 310 may then determine, based on the obtained request, that transferring the digital asset from the first blockchain account to the second blockchain account satisfies the one or more required permissions. For example, the blockchain contract corresponding to the digital asset may specify a maximum quantity of the digital asset that can be transferred in any one instance. The service-side system 310 may compare the quantity of the digital asset to be transferred with the maximum quantity. If the requested quantity is greater than the maximum quantity, the service-side system 310 may reject the request for transferring the digital asset.

As yet another example, the service-side system 310 may verify that the requested transfer of the digital asset does not violate one or more restrictions placed on the digital asset or the blockchain accounts involved in the transfer. In some embodiments, the service-side system 310 may query for any restriction placed on the first blockchain account or the second blockchain account and verify that transferring the quantity of the digital asset from the first blockchain account to the second blockchain account is not prohibited by any restriction placed on the first blockchain account or the second blockchain account. In some embodiments, the service-side system 310 may query for any restriction placed on the digital asset and verify that transferring the quantity of the digital asset from the first blockchain account to the second blockchain account is not prohibited by any restriction placed on the digital asset. The restrictions on the blockchain accounts or the digital asset may have been created and stored by the service-side system 310. The service-side system 310 may query one or more data stores for such restrictions. Alternatively, the restrictions may have been stored in the blockchain maintained by the blockchain system 330. Such restrictions may modify the blockchain contract corresponding to the digital asset such that blockchain transactions in violation of the restrictions cannot be approved by the consensus process associated with the blockchain system 330. Such restrictions may have been created by the service-side system 310 or one or more blockchain nodes associated with blockchain system 330. The one or more blockchain nodes may comprise, for example, a blockchain node corresponding to a regulatory authority for digital or tangible asset transactions. The service-side system 310 may query data stored in the blockchain for such restrictions.

At step 930, the service-side system 310 may generate, based on the obtained request, a blockchain transaction for transferring the quantity of the digital asset from the first blockchain account to the second blockchain account. The blockchain transaction may invoke the determined blockchain contract corresponding to the digital asset to be transferred. At step 930, the service-side system 310 may further send the generated blockchain transaction to a blockchain node associated with the blockchain system 330 for adding to the blockchain. In some embodiments, the blockchain transaction may comprise an identifier associated with the blockchain contract, an identifier associated with the first blockchain account, an identifier associated with the second blockchain account, the quantity of the digital asset to be transferred, other suitable information, or any combination thereof.

At step 940, the service-side system 310 may obtain, from the blockchain system 330, a result of the blockchain transaction for transferring the quantity of the digital asset from the first blockchain account to the second blockchain account. For example, the service-side system 310 may obtain a current state of the blockchain that has been confirmed by a consensus process of the blockchain system 330 and determine whether the blockchain transaction has been stored in the blockchain. If so, the service-side system 310 may determine that the transfer of the digital asset has been successfully completed. In some embodiments, the service-side system 310 may locally store information associated with the blockchain transaction for transferring the quantity of the digital asset from the first blockchain account to the second blockchain account. At step 950, the service-side system 310 may return a response to the user-side system 340 confirming successful transfer of the digital asset.

In some embodiments, the service-side system 310 may be configured to reverse a transfer of a quantity of a digital asset from one blockchain account to another. A situation warranting reversion of the transfer of digital asset may occur when, for example, a transfer was erroneously carried out, one party to the digital asset transaction fails to perform one or more actions required by the transaction (e.g., making a payment), the transfer was determined illegal by a regulatory authority, or other suitable events occurs. The service-side system 310 may obtain a request for reversing the blockchain transaction for transferring the quantity of the digital asset from the first blockchain account to the second blockchain account. For example, the regulation module 323 may have obtained information associated with the blockchain transaction for transferring the digital asset and have determined that the transfer of the digital asset is inconsistent with a corresponding asset transaction occurring at the user-side system 340. The regulation module 323 may generate a request for reversing the blockchain transaction accordingly. As another example, a blockchain node of the blockchain system 330 that corresponds to a regulatory authority may have scanned the blockchain and have determined the blockchain transaction for transferring the digital asset to be a violation of relevant regulations. The regulatory authority may then send the service-side system 310 a request for reversing the blockchain transaction. Based on the obtained request, the service-side system may generate a blockchain transaction for transferring the quantity of the digital asset from the second blockchain account to the first blockchain account. Then, the service-side system 310 may send the generated blockchain transaction for transferring the quantity of the digital asset from the second blockchain account to the first blockchain account to a blockchain node associated with the blockchain system 330 for adding to the blockchain.

Figure 10:
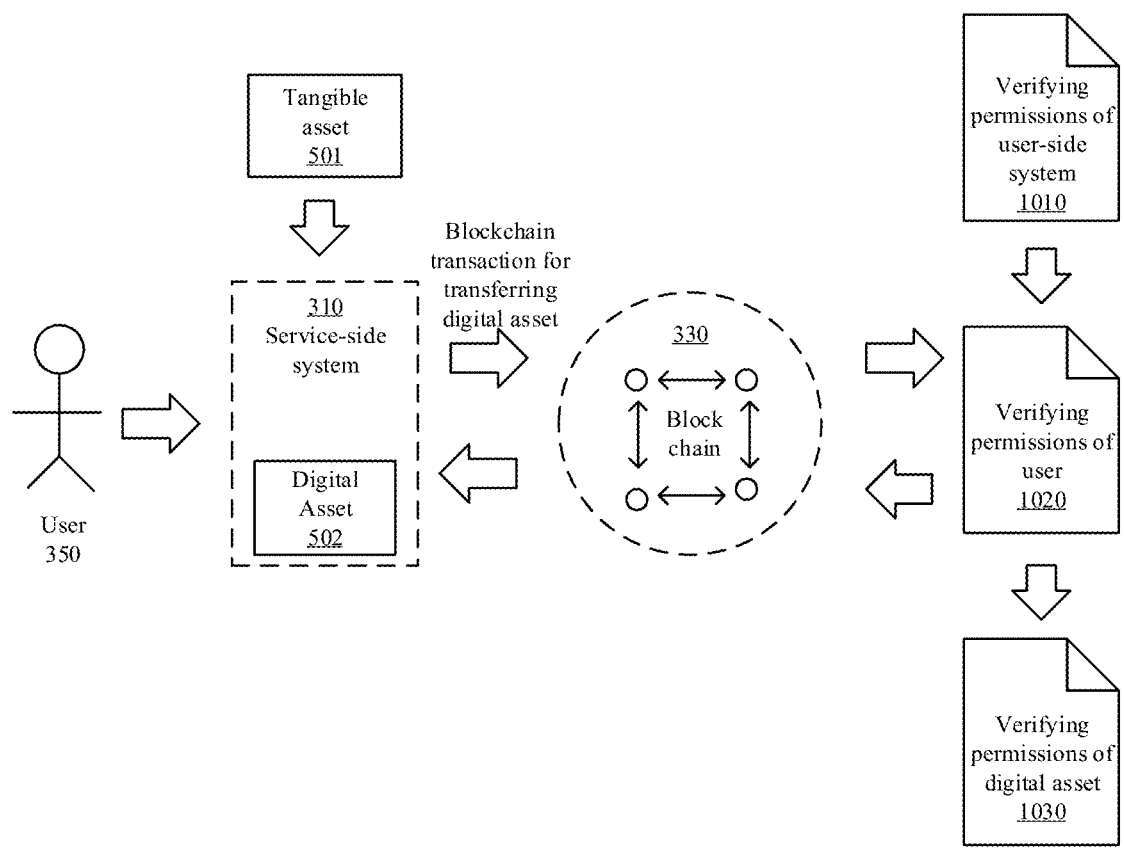
FIG. 10 illustrates operations for transferring a digital asset performed by a system for managing digital assets in accordance with some embodiments.

FIG. 10 illustrates operations for transferring a digital asset performed by a system for managing digital assets in accordance with some embodiments. In some embodiments, a service-side system 310 may have created a digital asset 502 corresponding to a tangible asset 501. A quantity of the digital asset 502 may be owned by a user 350. In some embodiments, the user may send a request to the service-side system 310 to transfer a quantity of the digital asset 502 in a first blockchain account associated with the user 350 to a second blockchain account associated with another user 350. The request may be sent by a user-side system 340 on behalf of the user 350. The service-side system 310 may generate one or more blockchain transactions for transferring the digital asset and add the blockchain transactions to the blockchain maintained by the blockchain system 330. The blockchain transactions may effectuate operation 1010, which may correspond to verifying permissions of the user-side system 340; operation 1020, which may correspond to verifying permissions of the user 350; and operation 1030, which may correspond to verifying permissions of the digital asset. The operations 1010, 1020, and 1030 may be performed by a virtual machine associated with the blockchain system 330 executing one or more blockchain contracts. The blockchain contracts may comprise a blockchain contract for managing permissions of user-side systems 340, a blockchain contract for managing permissions of blockchain account owners, a blockchain contract for managing permissions required for transferring digital assets, another suitable blockchain contract, or any combination thereof.

Figure 11:
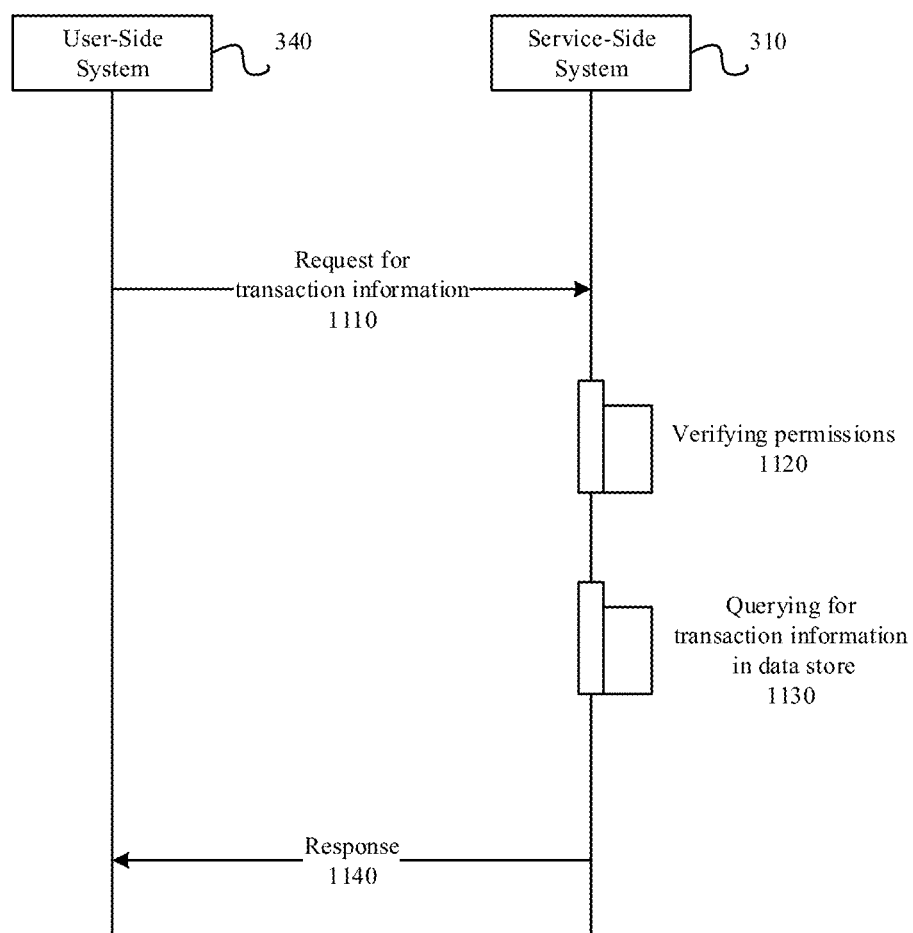
FIG. 11 illustrates a method for obtaining transaction information from a data store in accordance with some embodiments.

FIG. 11 illustrates a method 1100 for obtaining transaction information from a data store in accordance with some embodiments. The operations of the method presented below are intended to be illustrative. Depending on the implementation, the method may include additional, fewer, or alternative steps performed in various orders or in parallel. In some embodiments, the service-side system 310 may be configured to obtain information associated with transactions of digital assets from one or more data stores 314 associated with the service-side system 310. In some embodiments, the service-side system 310 may store a plurality of blockchain transactions it sends to the blockchain system 330 and/or a plurality of blockchain transactions it obtains from the blockchain system 330 in one or more of the data stores 314. In response to a request for transaction information, the service-side system 310 obtain the requested information from the data stores 314 and provide such information to the requester.

The method 1100 may start at step 1110, in which the service-side system 310 may receive a request for transaction information. The request may be received from a user-side system 340. The request for transaction information may comprise one or more criteria for the transaction information requested. For example, the request may comprise information associated with a blockchain account, information associated with a digital asset, a time period, other suitable criteria, or any combination thereof. At step 1120, the service-side system 310 may verify whether the requester of the transaction information possesses one or more required permissions to access the requested transaction information. If so, the service-side system 310 may proceed to step 1130. Otherwise, the service-side system 310 may reject the request. At step 1130, the service-side system 310 may query one or more data stores 314 associated with the service-side system 310 for the requested transaction information. The query may be based on the one or more criteria in the request for transaction information. At step 1140, the service-side system 310 may send a response to the user-side system 340, the response comprising any information responsive to the request that is obtained by the service-side system 340.

In some embodiments, the service-side system 310 may further store information associated with one or more blockchain accounts in one or more of the data stores 314. For example, the service-side system 310 may store a quantity of each of a plurality of digital assets in each of a plurality of blockchain accounts. In response to a request comprising an address associated with a blockchain account, the service-side system 310 may return a list of digital assets in the blockchain account and their corresponding quantities.

Figure 12:
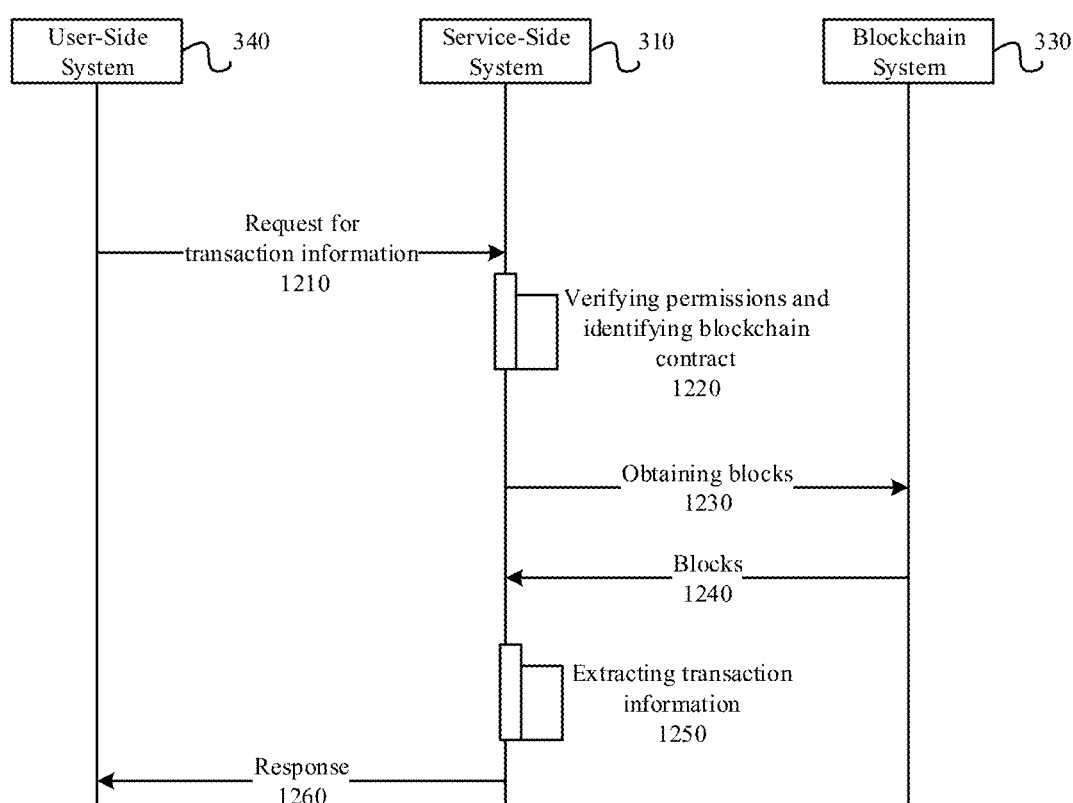
FIG. 12 illustrates a method for obtaining transaction information from a blockchain in accordance with some embodiments.

FIG. 12 illustrates a method 1200 for obtaining transaction information from a blockchain in accordance with some embodiments. The operations of the method presented below are intended to be illustrative. Depending on the implementation, the method may include additional, fewer, or alternative steps performed in various orders or in parallel. In some embodiments, the service-side system 310 may be configured to obtain information associated with transactions of digital assets from a blockchain maintained by the blockchain system 330. The method 1200 may start at step 1210, in which the service-side system 310 may receive a request for transaction information. The request for transaction information may be received from a user-side system 340. The request for transaction information may comprise one or more criteria for the transaction information requested. For example, the request may comprise information associated with a blockchain account, information associated with a digital asset, a time period, other suitable criteria, or any combination thereof. At step 1220, the service-side system 310 may verify whether the requester of the transaction information possesses one or more required permissions to access the requested transaction information. If so, the service-side system 310 may proceed to step 1230. Otherwise, the service-side system 310 may reject the request. At step 1220, the service-side system 310 may identify a blockchain contract associated with the requested transaction information. For example, based on information associated with a digital asset in the request for transaction information, the service-side system 310 may identify a blockchain contract corresponding to the digital asset.

At step 1230, the service-side system 310 may request one or more blocks of the blockchain maintained by the blockchain system 330. At step 1240, the service-side system 310 may obtain the one or more blocks from the blockchain system 330. The one or more blocks may be selected based on one or more of the criteria in the request. For example, the service-side system 310 may obtain one or more blocks added to the blockchain in a time period specified in the request.

At step 1250, the service-side system 310 may extract one or more blockchain transactions from the one or more obtained blocks. The blockchain transactions may be extracted based on one or more criteria in the request. As an example, the service-side system 310 may extract one or more blockchain transactions associated with a blockchain account of the blockchain. As another example, the service-side system 310 may extract one or more blockchain transactions associated with a digital asset or one or more blockchain transactions invoking a blockchain contract corresponding to the digital asset. As yet another example, the service-side system 310 may extract one or more blockchain transactions associated with both a digital asset and a blockchain account. In some embodiments, the service-side system 310 may analyze the extracted one or more blockchain transactions to obtain one or more results. As an example, the service-side system 310 may determine, based on the one or more extracted blockchain transactions, a quantity of the digital asset in the blockchain account. As another example, the service-side system 310 may determine a transaction history associated with the blockchain account based on the one or more extracted blockchain transactions. As yet another example, the service-side system 310 may determine a transaction history associated with the digital asset based on the one or more extracted blockchain transactions. At step 1260, the service-side system 310 may send a response to the user-side system 340. The response may comprise one or more blockchain transactions responsive to the request or one or more analysis results based on the extracted blockchain transactions.

In some embodiments, the service-side system 310 may receive a request for information associated with a digital asset. The request may be sent by a user 350 via the user-side system 340 or the service application 360. The service-side system 310 may obtain data associated with a blockchain contract corresponding to the digital asset and one or more blockchain transactions invoking the blockchain contract. The service-side system 310 may determine one or more characteristics associated with the digital asset and return the information to the requester.

Figure 13:
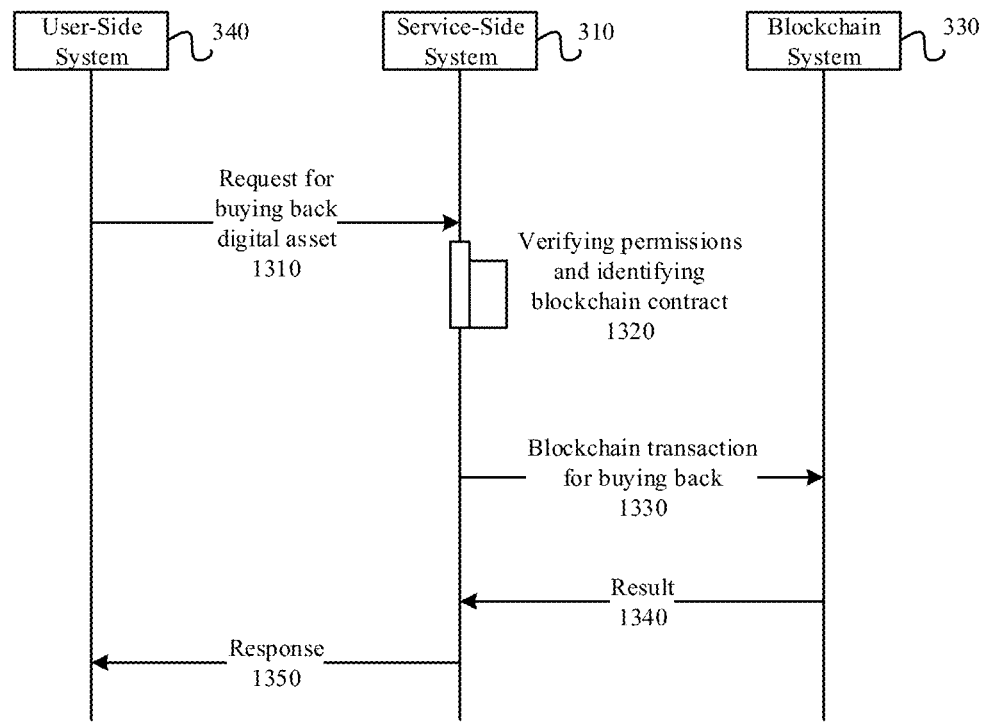
FIG. 13 illustrates a method for buying back a quantity of a digital asset in accordance with some embodiments.

FIG. 13 illustrates a method 1300 for buying back a quantity of a digital asset in accordance with some embodiments. The operations of the method presented below are intended to be illustrative. Depending on the implementation, the method may include additional, fewer, or alternative steps performed in various orders or in parallel. In some embodiments, the service-side system 310 may facilitate a creator of a digital asset or another appropriate entity to buy back the digital asset. Events warranting buying back a digital asset may comprise, for example, destruction of a tangible asset corresponding to the digital asset, buy out of the tangible asset corresponding to the digital asset, business changes to the creator that require liquidation of its assets, other suitable events, or any combination thereof.

The method 1300 may start at step 1310, in which a service-side system 310 may obtain a request for buying back a digital asset. The request may be sent by the user-side system 340 that may have initially created the digital asset. The request may specify one or more blockchain accounts from which the digital asset is to be bought back and a quantity of the digital asset to be bought back of each of the one or more blockchain accounts. At step 1320, the service-side system 310 may verify that the sender of the request for buying back the digital asset possesses one or more permissions for carrying out the buy-back operations. As an example, the service-side system 310 may grant an initial creator of the digital asset the permissions necessary to buy back the digital asset. As another example, service-side system 310 may require the sender of the request to show good cause or basis for the buy-back operation. At step 1320, the service-side system 310 may further identify a blockchain contract corresponding to the digital asset to be bought back. Based on one or more parameters stored in association with the blockchain contract, the service-side system 310 may further determine one or more terms of the buy-back operation (e.g., a price of the buy-back transaction). At step 1330, the service-side system 310 may generate a blockchain transaction for transferring the digital asset from the one or more blockchain accounts storing the digital asset to a buy-back blockchain account associated with the blockchain. The blockchain transaction may invoke the identified blockchain contract corresponding to the digital asset. Any digital asset in the buy-back blockchain account may be prohibited from being transferred out of the buy-back blockchain account. For example, the blockchain contract may comprise a restriction prohibiting transfer of the digital asset out of the buy-back blockchain account. At step 1330, the service-side system 310 may send, to a blockchain node associated with the blockchain system 330 for adding to the blockchain, the blockchain transaction for transferring the transferred digital asset from the one or more blockchain accounts to the buy-back blockchain account. At step 1340, the service-side system 310 may obtain a result of the blockchain transaction from the blockchain and determine whether the buy-back operation was successful. At step 1350, the service-side system 310 may send a response to the user-side system 340, the response indicating the result of the blockchain transaction.

Figure 14:
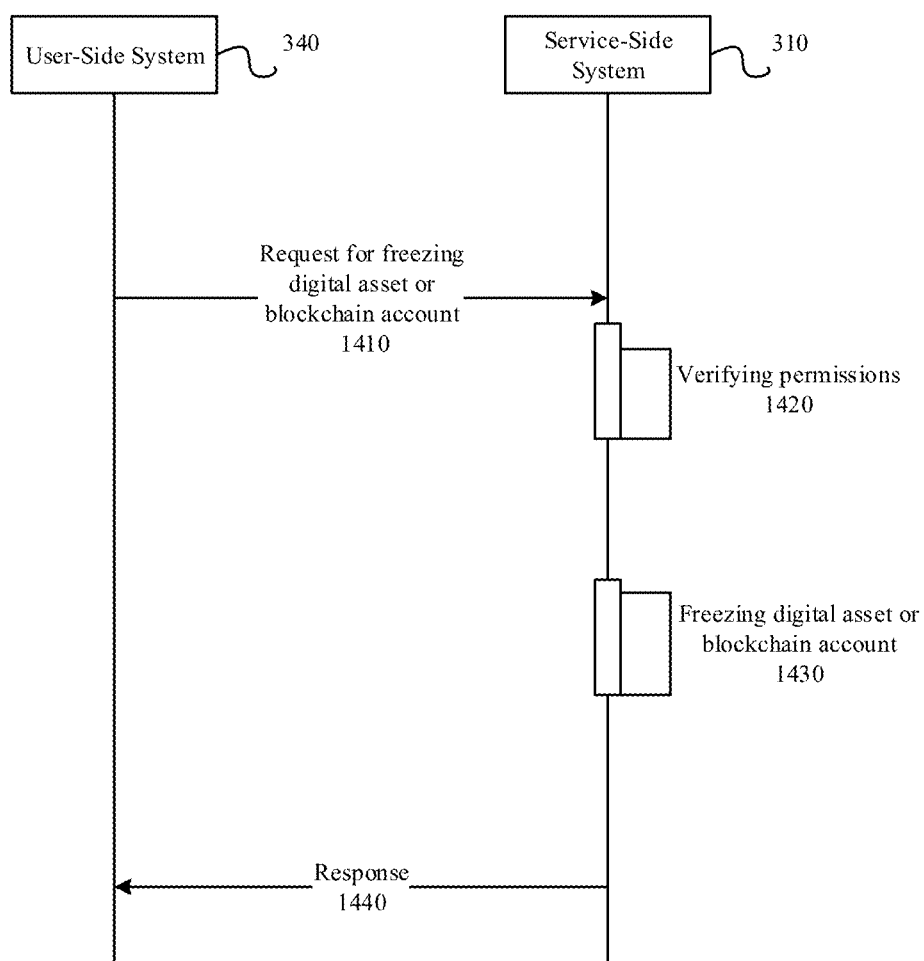
FIG. 14 illustrates a method for freezing a blockchain account or a digital asset in accordance with some embodiments.

FIG. 14 illustrates a method 1400 for freezing a blockchain account or a digital asset in accordance with some embodiments. The operations of the method presented below are intended to be illustrative. Depending on the implementation, the method may include additional, fewer, or alternative steps performed in various orders or in parallel. In some embodiments, the service-side system 310 may freeze or lock a digital asset or a blockchain account, thus preventing the digital asset or the blockchain account from participating in digital asset transactions. Events warranting freezing a digital asset or a blockchain account may comprise, for example, irregularities or suspicious activities found in the trading activities associated with the digital asset or the blockchain account, regulatory issues associated with a tangible asset corresponding to the digital asset, other suitable events, or any combination thereof.

The method 1400 may start at step 1410, in which the service-side system 310 may receive a request for freezing a digital asset or a blockchain account. The request may be received from a user-side system 340. In response to the request, at step 1420, the service-side system 310 may verify that the sender of the request possess one or more required permissions for carrying out the operation for freezing the digital asset or the blockchain account. For example, the service-side system 310 may have granted a user-side system 340 one or more permissions to freeze all digital assets created by the user-side system 340 or digital assets corresponding to tangible assets in possession of the entity corresponding to the user-side system 340. As another example, the service-side system 310 may have granted a user-side system 340 one or more permissions to freeze all blockchain accounts associated with user accounts of the user-side system 340. The user-side system 310 may have requested the creation of the blockchain accounts on behalf of their corresponding users. If the verification is successful, the service-side system 310 may proceed to step 1430. Otherwise, the service-side system may reject the request. At step 1430, the service-side system 310 may freeze or lock the digital asset or the blockchain account identified in the request. The service-side system 310 may store in one or more data stores 314 a status of the digital asset or blockchain account as frozen or locked. With such a status record, the service-side system 310 may reject all subsequent transfer or other suitable requests related to the digital asset of the blockchain account. At step 1440, the service-side system 310 may return a response to the user-side system 340 indicating successful performance of the freezing or locking operation.

In some embodiments, a quantity of a digital asset in a blockchain account may be locked or frozen via one or more blockchain transactions. For example, the service-side system 310 may obtain a request for freezing a quantity of a digital asset. In response to the request, the service-side system 310 may generate, based on the request for freezing the quantity of the digital asset, a blockchain transaction for transferring the quantity of the digital asset from an unrestricted blockchain account to a restricted blockchain account. The service-side system may then send, to a blockchain node for adding to the blockchain, the blockchain transaction for transferring the quantity of the digital asset from the unrestricted blockchain account to the restricted blockchain account. Any transfer of the digital asset from the restricted blockchain account may be prohibited by operation of the blockchain system 330. In additional to the service-side system 310, the blockchain transaction for freezing the digital asset may alternatively be generated and added by a blockchain node associated with the blockchain system 330. The blockchain node may correspond to, for example, a regulatory agency associated with the digital asset.

Figure 15:
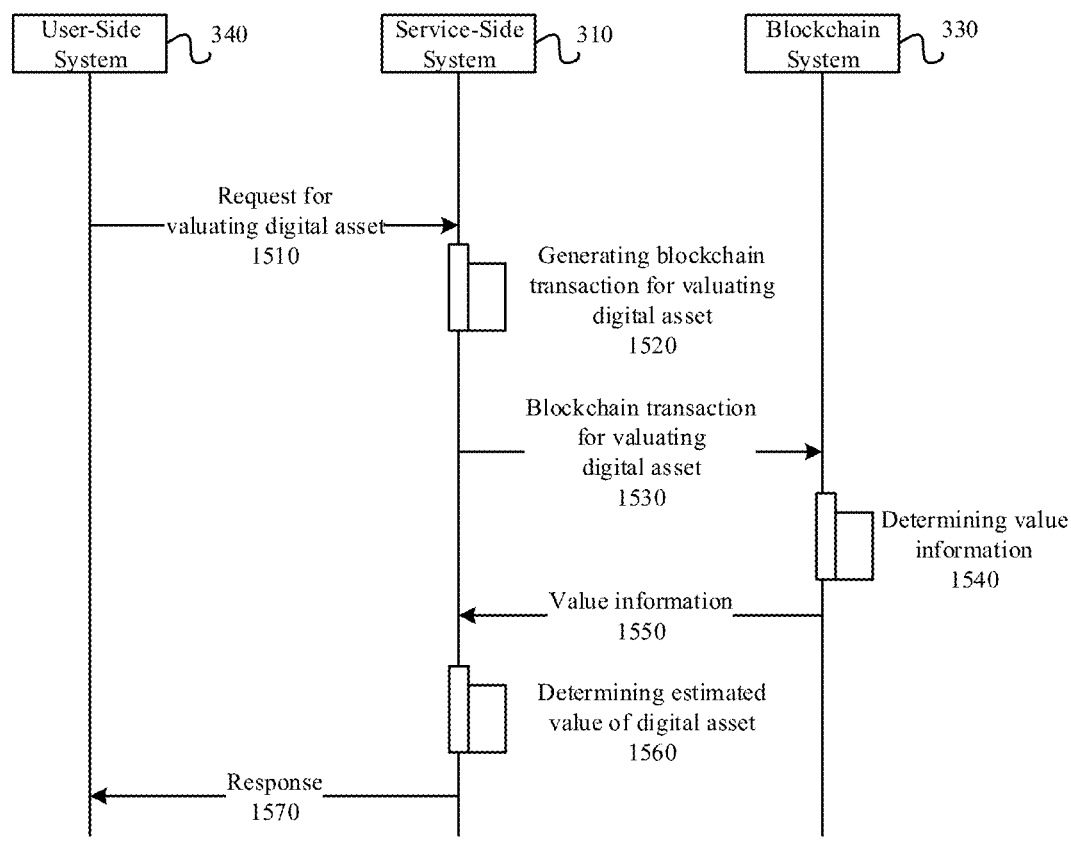
FIG. 15 illustrates a method for valuating a digital asset in accordance with some embodiments.

FIG. 15 illustrates a method 1500 for valuating a digital asset in accordance with some embodiments. The operations of the method presented below are intended to be illustrative. Depending on the implementation, the method may include additional, fewer, or alternative steps performed in various orders or in parallel. In some embodiments, the blockchain maintained by the blockchain system 330 may comprise one or more blockchain contracts executable by a virtual machine associated with the blockchain to automatically valuate a digital asset that is created on the blockchain. The one or more blockchain contracts may have been generated by the service-side system 310 and deployed on the blockchain. The service-side system 310 may be configured to interact with the one or more blockchain contracts to determine estimated values of digital assets. The method 1500 may start at step 1510, in which the service-side system may obtain a request for valuating a digital asset corresponding to a tangible asset. The request may be received form the user-side system 340 or directly from a user via a service application 360. Information associated with the digital asset may be stored in the blockchain maintained by the blockchain system 330. In some embodiments, the request may identify a digital asset that has been created on the blockchain and may comprise information associated with a blockchain contract corresponding to the digital asset. In other embodiments, the request may identify a digital asset that will potentially be created on the blockchain and may comprise information associated with a tangible asset corresponding to the digital asset and one or more characteristics of the to-be-created digital asset.

At step 1520, the service-side system 310 may generate, based on the obtained request, a blockchain transaction for valuating the digital asset. The blockchain transaction may invoke a blockchain contract executable for determining value information associated with the digital asset. In some embodiments, the digital asset to be valuated may have been created on the blockchain. Based on the request, the service-side system 310 may have identified a blockchain contract associated with the blockchain that is executable for issuing the digital asset and included information associated with the identified blockchain contract in the blockchain transaction. The blockchain transaction may comprise an identifier associated with the digital asset, an identifier associated with a blockchain contract executable for issuing the digital asset, other suitable information, or any combination thereof. In other embodiments, the blockchain transaction may be for a digital asset that has not been created on the blockchain. The blockchain transaction may comprise information associated with one or more characteristics of the tangible asset corresponding to the digital asset.

At step 1530, the service-side system 310 may send the blockchain transaction to a blockchain node associated with the blockchain for adding to the blockchain. In some embodiments, the blockchain transaction, when added to the blockchain, may trigger execution of the blockchain contract for determining value information associated with the digital asset by a virtual machine associated with the blockchain system 330. The blockchain system 330 may execute the blockchain contract to determine value information associated with the digital asset at step 1540. The determined value information may be stored in the blockchain. The blockchain contract may be executed to identify information associated with one or more characteristics of the tangible asset corresponding to the digital asset in the request. Based on the one or more characteristics of the tangible asset, the blockchain contract may be executed to determine one or more other digital assets corresponding to one or more other tangible assets, respectively. The one or more other digital assets may have been created on the blockchain as well and their information may be stored in the blockchain and accessible to the blockchain contract. The one or more other tangible assets may have characteristics similar to the one or more characteristics of the tangible asset corresponding to the digital asset. Then, the blockchain contract may be executed to determine value information associated with the digital asset based on the determined one or more other digital assets. In some embodiments, the one or more characteristics of the tangible asset that are used to identify other similar tangible assets may comprise a quantity of the tangible asset, a size of the tangible asset, an appearance of the tangible asset, a material associated with the tangible asset, a timeframe associated with creation of the tangible asset, a creator of the tangible asset, a condition of the tangible asset, other suitable characteristics, or any combination thereof.

At step 1550, the service-side system 310 may obtain the value information associated with the digital asset from the blockchain. The service-side system 310 may obtain one or more blocks associated with the blockchain and extract the value information from the obtained blocks. In some embodiments, the value information associated with the digital asset may comprise an identifier corresponding to one of the one or more other digital assets and an estimated ratio between the value of the digital asset and a value of the one other digital asset. In this manner, one or more digital assets corresponding to similar tangible assets may be used as a reference to describe the value of the digital asset of interest. In some embodiments, the value information associated with the digital asset may comprise references to a plurality of other digital assets. The value information may comprise a weight associated with a value of each of the other digital assets.

At step 1560, the service-side system 310 may determine an estimated value of the digital asset based on the value information obtained from the blockchain. In some embodiments, to determine the estimated value of the digital asset, the service-side system 310 may retrieving, from the value information obtained from the blockchain, information associated with one or more other digital assets determined to be similar to the digital asset. The service-side system 310 may then obtain one or more valuations for the one or more other digital assets, respectively, and determine the estimated value associated with the digital asset based on the obtained one or more valuations for the one or more other digital assets. Here, the valuations for the one or more other digital assets may be stored in one or more data stores 314 associated with the service-side system 310 or the blockchain maintained by the blockchain system 330. The valuations may have been provided by one or more external systems, such as the user-side system 340, or determined by the service-side system 310. In some embodiments, to determine the estimated value associated with the digital asset, the service-side system 310 may calculate a weighted average of the obtained one or more valuations for the one or more other digital assets. In other embodiments, to determine the estimated value associated with the digital asset, the service-side system 310 may adjust one of the one or more valuations for one of the one or more other digital assets based on a comparison between a condition of the tangible asset corresponding to the digital asset and a condition of a tangible asset corresponding to the one of the one or more other digital assets.

At step 1570, the service-side system 310 may send a response comprising the estimated value of the digital asset to a sender of the request for valuating the digital asset. For example, the service-side system 310 may send the response to the user-side system 340.

Figure 16:
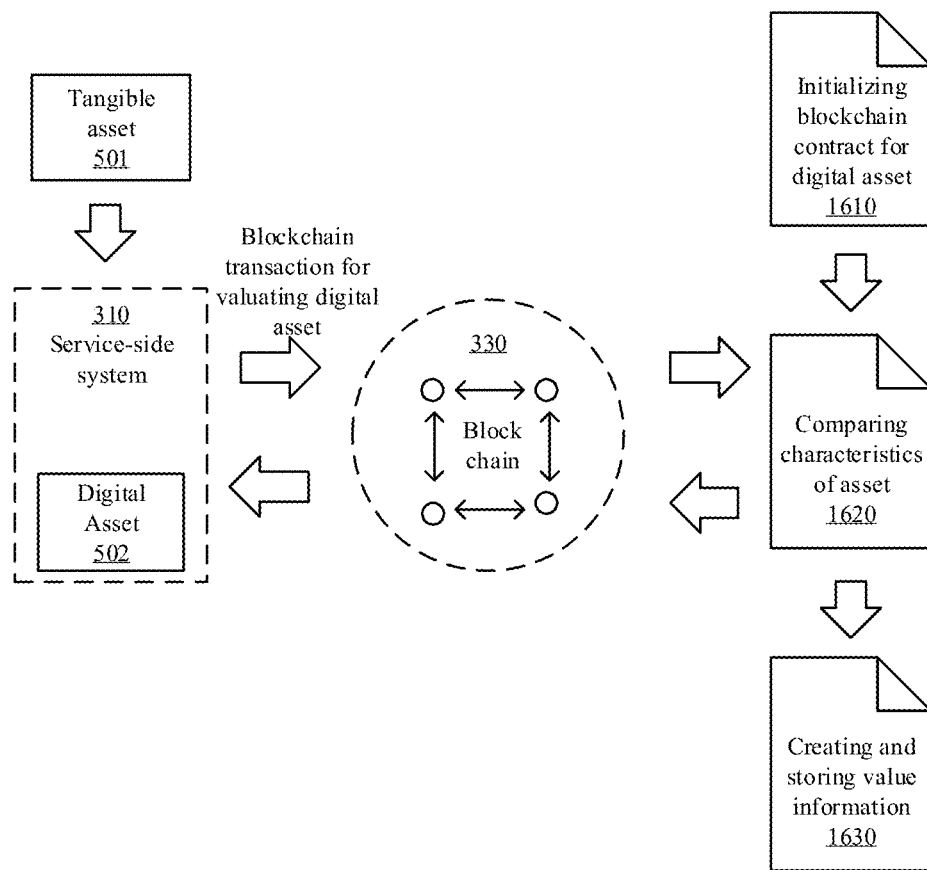
FIG. 16 illustrates operations for valuating a digital asset performed by a system for managing digital assets in accordance with some embodiments.

FIG. 16 illustrates operations for valuating a digital asset performed by a system for managing digital assets in accordance with some embodiments. In some embodiments, a large number of digital assets may be created on a blockchain maintained by a blockchain system 330 to represent ownership and value of a large number of corresponding tangible assets. Based on characteristics and valuations of the digital assets, a blockchain contract may be generated. The generated blockchain contract may be executable to automatically valuate new digital assets. In some embodiments, a service-side system 310 may create a digital asset 502 corresponding to a tangible asset 501 and evaluate the created digital asset 502. In some embodiments, the service-side system 310 may generate one or more blockchain transactions for creating and valuating the digital asset 502. The service-side system 310 may send the one or more blockchain transactions to the blockchain system 330 for adding to a blockchain maintained by the blockchain system 330. The one or more blockchain transactions may effectuate operation 1610, which may correspond to initializing a blockchain contract corresponding to the digital asset and configured to issue the digital asset; operation 1620, which may correspond to comparing one or more characteristics of the digital asset 502 or its corresponding tangible asset 501 to those of one or more other assets to identify one or more other similar digital assets; and operation 1630, which may correspond to creating and storing value information associated with the digital asset. The operations 1610, 1620, and 1630 may be performed by a virtual machine associated with the blockchain system 330 executing one or more blockchain contracts. The blockchain contracts may comprise a blockchain contract executable to issue, transfer, or place restrictions on the digital asset 502, a blockchain contract for valuating one or more digital assets, another suitable blockchain contract, or any combination thereof.

Figure 17:
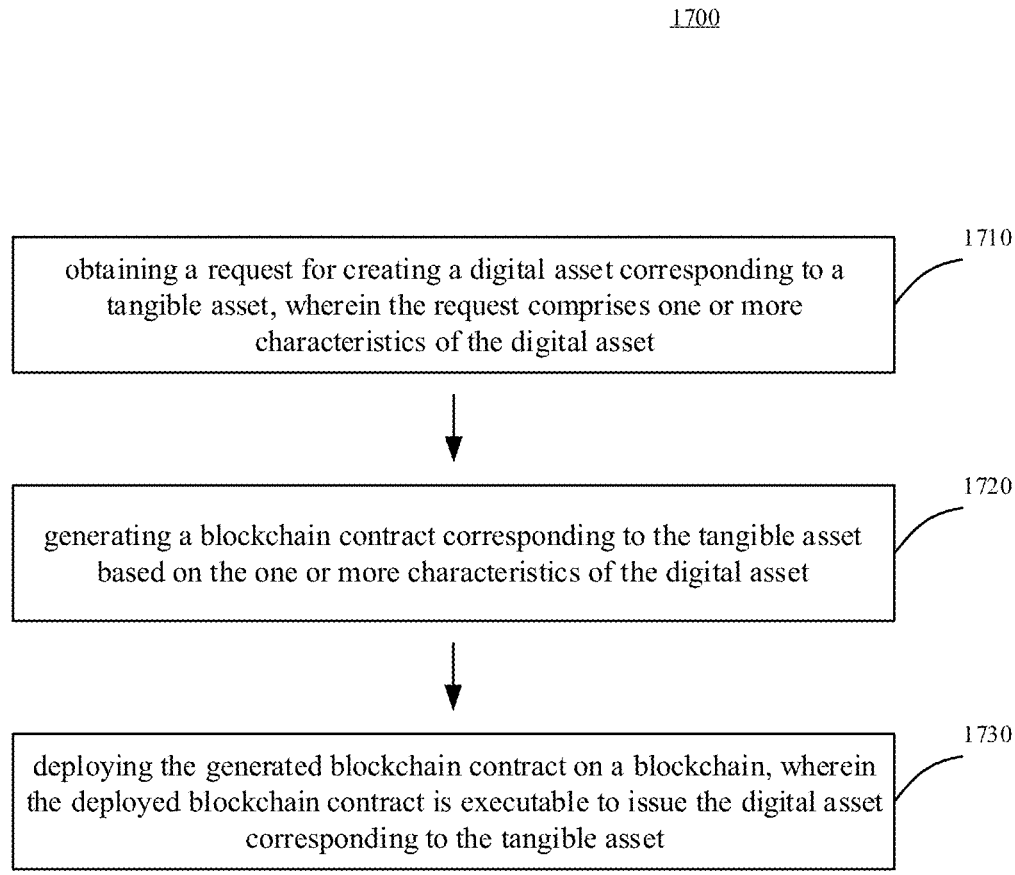
FIG. 17 illustrates a method for creating a digital asset in accordance with some embodiments.

FIG. 17 illustrates a method 1700 for creating a digital asset in accordance with some embodiments. The method 1700 may be performed by a device, apparatus, or system for digital asset management. The method 1700 may be performed by one or more components of the environment or system illustrated by FIGS. 1-3, such as one or more components of the service-side system 310. Depending on the implementation, the method 1700 may include additional, fewer, or alternative steps performed in various orders or in parallel.

Block 1710 includes obtaining a request for creating a digital asset corresponding to a tangible asset, wherein the request comprises one or more characteristics of the digital asset. In some embodiments, the digital asset represents a value of the tangible asset. In some embodiments, the request comprises a proof indicating an authenticity and a condition of the tangible asset.

Block 1720 includes generating a blockchain contract corresponding to the tangible asset based on the one or more characteristics of the digital asset. In some embodiments, the blockchain contract comprises one or more properties associated with the digital asset. The one or more properties comprise a total quantity of the digital asset, a type of the digital asset, a blockchain account associated with the digital asset's creator, a quantity of the digital asset kept in the blockchain account associated with the digital asset's creator, date for an initial issuance of the digital asset, or a quantity of the digital asset for the initial issuance of the digital asset. In some embodiments, the blockchain contract comprises one or more required permissions for one or more blockchain accounts associated with the blockchain or one or more required permissions for performing one or more operations with respect to the digital asset. In some embodiments, the blockchain contract comprises one or more executable functions. The executable functions comprise a function executable to issue a quantity of the digital asset to one or more blockchain accounts associated with the blockchain, a function executable to transfer a quantity of the digital asset from a first blockchain account associated with the blockchain to a second blockchain account associated with the blockchain, a function executable to set one or more restrictions on the digital asset, a function executable to remove the one or more restrictions on the digital asset, or a function executable to determine whether a permission associated with the digital asset is provided.

In some embodiments, the method further comprises, after obtaining the request and before generating the blockchain contract, determining, based on obtained request, one or more permissions associated with a creator of the digital asset and verifying that the permissions associated with the creator satisfy one or more required permissions for digital asset creator.

Block 1730 includes deploying the generated blockchain contract on a blockchain, wherein the deployed blockchain contract is executable to issue the digital asset corresponding to the tangible asset. In some embodiments, the blockchain is maintained by a plurality of blockchain nodes. One or more of the blockchain nodes correspond to one or more asset exchange institutions or one or more asset exchange regulatory agencies. In some embodiments, the deploying the generated blockchain contract on the blockchain comprises generating a blockchain transaction comprising the generated blockchain contract and sending the blockchain transaction to a blockchain node for adding to the blockchain. In some embodiments, the blockchain transaction comprising the generated blockchain contract further comprises information associated with the tangible asset corresponding to the digital asset. The information comprises an identifier of the tangible asset, a valuation of the tangible asset, a timeframe associated with creation of the tangible asset, a characteristic of the tangible asset, or a quantity of the tangible asset. In some embodiments, the method further comprises locally storing information associated with the tangible asset in correspondence with information associated with the deployed blockchain contract.

In some embodiments, the method further comprises generating a blockchain transaction for modifying one or more of the one or more properties associated with the digital asset and sending the blockchain transaction to a blockchain node for adding to the blockchain, wherein the blockchain transaction invokes the deployed blockchain contract. In some embodiments, the method further comprises generating a blockchain transaction for issuing a quantity of the digital asset to a blockchain account associated with the blockchain, wherein the blockchain transaction invokes the blockchain contract and sending the blockchain transaction to a blockchain node for adding to the blockchain.

In some embodiments, the method further comprises obtaining one or more blocks of the blockchain, extracting, from the one or more obtained blocks, one or more blockchain transactions associated with a blockchain account of the blockchain, and determining, based on the one or more extracted blockchain transactions, a quantity of the digital asset in the blockchain account. In some embodiments, the method further comprises obtaining one or more blocks of the blockchain, extracting, from the obtained one or more blocks, one or more blockchain transactions invoking the blockchain contract, and determining a transaction history associated with the digital asset based on the one or more extracted blockchain transactions.

Figure 18:
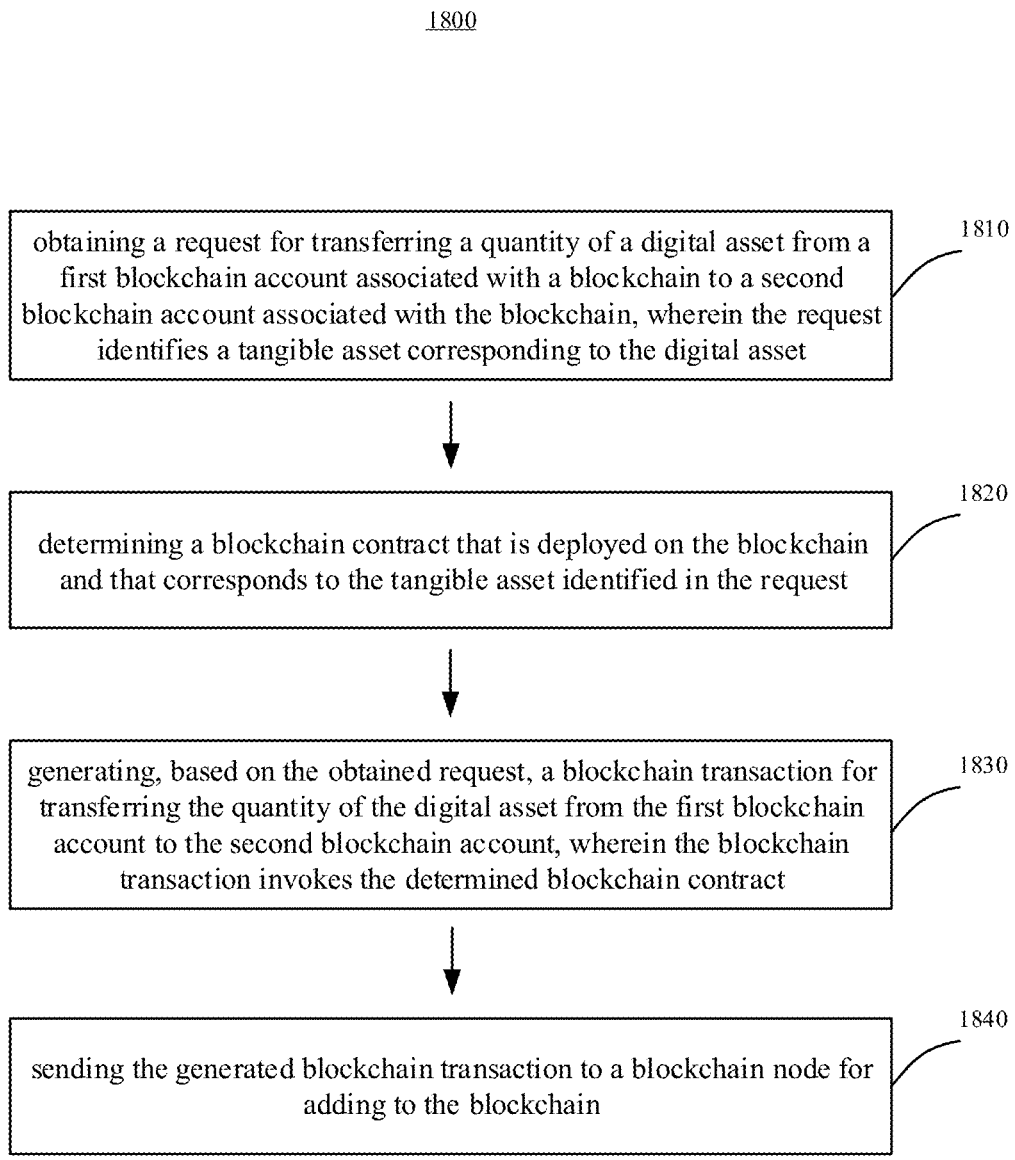
FIG. 18 illustrates a method for transferring a digital asset in accordance with some embodiments.

FIG. 18 illustrates a method for transferring a digital asset in accordance with some embodiments. The method 1800 may be performed by a device, apparatus, or system for digital asset transfer. The method 1800 may be performed by one or more components of the environment or system illustrated by FIGS. 1-3, such as one or more components of the service-side system 310. Depending on the implementation, the method 1800 may include additional, fewer, or alternative steps performed in various orders or in parallel.

Block 1810 includes obtaining a request for transferring a quantity of a digital asset from a first blockchain account associated with a blockchain to a second blockchain account associated with the blockchain, wherein the request identifies a tangible asset corresponding to the digital asset.

In some embodiments, the method further comprises, before obtaining the request for transferring the quantity of the digital asset from the first blockchain account to the second blockchain account, generating a blockchain transaction for issuing a quantity of the digital asset to the first blockchain account, wherein the blockchain transaction for issuing the digital asset invokes the blockchain contract and sending the blockchain transaction for issuing the digital asset to the blockchain node for adding to the blockchain.

Block 1820 includes determining a blockchain contract that is deployed on the blockchain and that corresponds to the tangible asset identified in the request.

Block 1830 includes generating, based on the obtained request, a blockchain transaction for transferring the quantity of the digital asset from the first blockchain account to the second blockchain account, wherein the blockchain transaction invokes the determined blockchain contract. In some embodiments, the blockchain transaction comprises an identifier associated with the blockchain contract, an identifier associated with the first blockchain account, an identifier associated with the second blockchain account, or the quantity of the digital asset to be transferred.

In some embodiments, the method further comprises, before generating the blockchain transaction, determining, based on the obtained request, one or more permissions associated with a sender of the request for transferring the digital asset and verifying that the permissions associated with the sender satisfy one or more required permissions for transferring the digital asset from the first blockchain account to the second blockchain account. In some embodiments, the method further comprises, before generating the blockchain transaction, obtaining, from the blockchain, data associated with the first blockchain account; determining, based on the obtained data, a quantity of the digital asset in the first blockchain account; and verifying that the determined quantity of the digital asset in the first blockchain account is no less than the quantity of the digital asset to be transferred. In some embodiments, the method further comprises, before generating the blockchain transaction, determining, based on the blockchain contract, one or more required permissions for transferring the digital asset and determining, based on the obtained request, that transferring the digital asset from the first blockchain account to the second blockchain account satisfies the one or more required permissions. In some embodiments, the method further comprises, before generating the blockchain transaction, obtaining, from the request, a proof that an entity associated with the first blockchain account approved the transfer of the digital asset.

In some embodiments, the method further comprises, before generating the blockchain transaction for transferring the quantity of the digital asset from the first blockchain account to the second blockchain account, querying for any restriction placed on the first blockchain account or the second blockchain account and verifying that transferring the quantity of the digital asset from the first blockchain account to the second blockchain account is not prohibited by any restriction placed on the first blockchain account or the second blockchain account. In some embodiments, the method further comprises, before generating the blockchain transaction for transferring the quantity of the digital asset from the first blockchain account to the second blockchain account, querying for any restriction placed on the digital asset and verifying that transferring the quantity of the digital asset from the first blockchain account to the second blockchain account is not prohibited by any restriction placed on the digital asset.

Block 1840 includes sending the generated blockchain transaction to a blockchain node for adding to the blockchain. In some embodiments, the method further comprises locally storing information associated with the blockchain transaction for transferring the quantity of the digital asset from the first blockchain account to the second blockchain account.

In some embodiments, the method further comprises, subsequent to sending the generated blockchain transaction to the blockchain node for adding to the blockchain, obtaining a request for reversing the blockchain transaction for transferring the quantity of the digital asset from the first blockchain account to the second blockchain account; generating, based on the obtained request for reversing the blockchain transaction, a blockchain transaction for transferring the quantity of the digital asset from the second blockchain account to the first blockchain account; and sending the generated blockchain transaction for transferring the quantity of the digital asset from the second blockchain account to the first blockchain account to the blockchain node for adding to the blockchain.

In some embodiments, the method further comprises obtaining a request for buying back the transferred digital asset from the second blockchain account; generating a blockchain transaction for transferring the transferred digital asset from the second blockchain account to a buy-back blockchain account associated with the blockchain, wherein the blockchain contract comprises a restriction prohibiting transfer of the digital asset out of the buy-back blockchain account; and sending, to the blockchain node for adding to the blockchain, the blockchain transaction for transferring the transferred digital asset from the second blockchain account to the buy-back blockchain account.

In some embodiments, the method further comprises obtaining one or more blocks of the blockchain; extracting, from the obtained one or more blocks, one or more blockchain transactions invoking the blockchain contract; and determining a transaction history associated with the digital asset based on the one or more extracted blockchain transactions. In some embodiments, the method further comprises obtaining one or more blocks of the blockchain; extracting, from the obtained one or more blocks, one or more blockchain transactions associated with the first blockchain account; and determining a transaction history associated with the first blockchain account based on the one or more extracted blockchain transactions.

Figure 19:
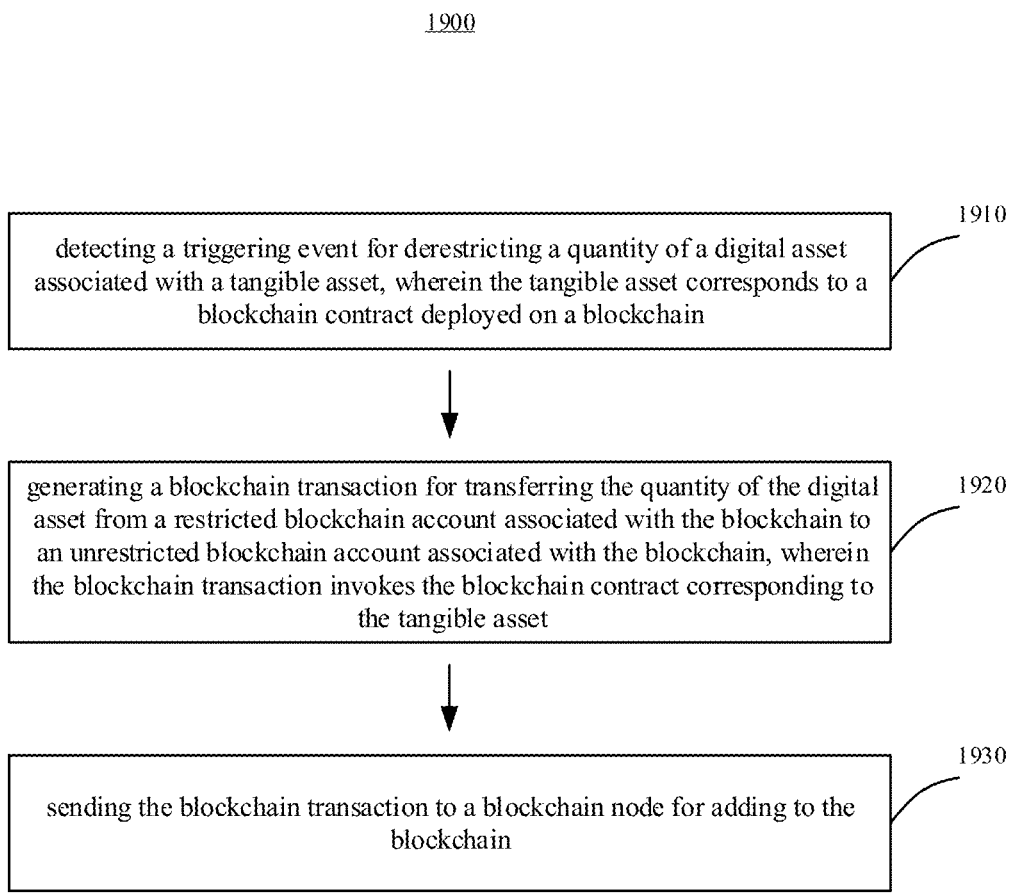
FIG. 19 illustrates a method for derestricting a digital asset in accordance with some embodiments.

FIG. 19 illustrates a method for derestricting a digital asset in accordance with some embodiments. The method 1900 may be performed by a device, apparatus, or system for controlling restrictions on digital asset. The method 1900 may be performed by one or more components of the environment or system illustrated by FIGS. 1-3, such as one or more components of the service-side system 310. Depending on the implementation, the method 1900 may include additional, fewer, or alternative steps performed in various orders or in parallel.

Block 1910 includes detecting a triggering event for derestricting a quantity of a digital asset associated with a tangible asset, wherein the tangible asset corresponds to a blockchain contract deployed on a blockchain. In some embodiments, the detecting the triggering event for derestricting the quantity of the digital asset comprises obtaining a request for derestricting the quantity of the digital asset, determining, based on the request, one or more permissions associated with a sender of the request, and verifying that the one or more permissions associated with the sender satisfy one or more required permissions for derestricting the quantity of the digital asset. In some embodiments, the detecting the triggering event for derestricting the quantity of the digital asset comprises determining, based on a current time, that a time-based condition is met. In some embodiments, the detecting the triggering event for derestricting the digital asset comprises obtaining, at a pre-scheduled point of time, a plurality of conditions for derestricting a plurality of digital assets, wherein the plurality of digital assets comprise the digital asset associated with the tangible asset and determining that one or more of the obtained conditions are met.

In some embodiments, the method further comprises, before detecting the triggering event, generating a blockchain transaction for issuing a quantity of the digital asset to the restricted blockchain account, wherein the quantity of the digital asset to be issued is greater than the quantity of the digital asset to be transferred and sending, to a blockchain node for adding to the blockchain, the blockchain transaction for issuing the digital asset to the restricted blockchain account.

Block 1920 includes generating a blockchain transaction for transferring the quantity of the digital asset from a restricted blockchain account associated with the blockchain to an unrestricted blockchain account associated with the blockchain, wherein the blockchain transaction invokes the blockchain contract corresponding to the tangible asset. In some embodiments, the blockchain transaction comprises an identifier associated with the blockchain contract, an identifier associated with the restricted blockchain account, an identifier associated with the unrestricted blockchain account, or the quantity of the digital asset to be derestricted. In some embodiments, the blockchain transaction comprises a transfer of a plurality of digital assets from a plurality of restricted blockchain accounts to a plurality of unrestricted blockchain accounts, wherein the plurality of digital assets comprise the digital asset associated with the tangible asset.

In some embodiments, the generating the blockchain transaction comprises determining a quantity of the digital asset in the restricted blockchain account and determining the quantity of the digital asset to be derestricted as a preset portion of the determined quantity of the digital asset in the restricted blockchain account. In some embodiments, the generating the blockchain transaction for issuing the digital asset to the restricted blockchain account comprises determining the quantity of the digital asset for issuing and verifying that the determined quantity is no greater than a quantity of the digital asset for initial issuance, wherein the quantity of the digital asset for initial issuance is stored in association with the blockchain contract in the blockchain.

Block 1930 includes sending the blockchain transaction to a blockchain node for adding to the blockchain. In some embodiments, the method further comprises locally storing information associated with the blockchain transaction for issuing the digital asset to the restricted blockchain account and locally storing one or more derestriction conditions in correspondence with information associated with the restricted blockchain account. In some embodiments, the locally stored one or more derestriction conditions comprise a time schedule for derestricting the digital asset.

In some embodiments, the method further comprises, after sending the blockchain transaction for transferring the quantity of the digital asset to the blockchain node for adding to the blockchain, obtaining a request for freezing the quantity of the digital asset; generating, based on the request for freezing the quantity of the digital asset, a blockchain transaction for transferring the quantity of the digital asset from the unrestricted blockchain account to the restricted blockchain account; and sending, to the blockchain node for adding to the blockchain, the blockchain transaction for transferring the quantity of the digital asset from the unrestricted blockchain account to the restricted blockchain account.

Figure 20:
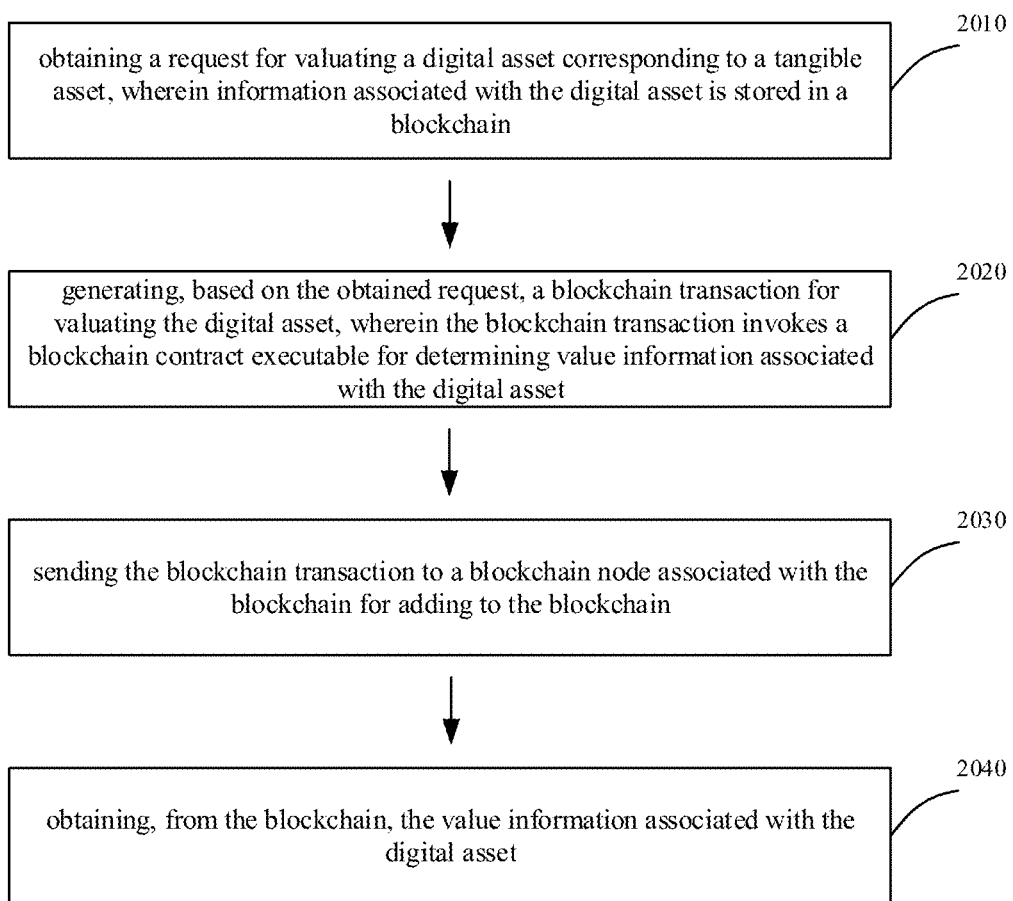
FIG. 20 illustrates a method for valuating a digital asset in accordance with some embodiments.

FIG. 20 illustrates a method for valuating a digital asset in accordance with some embodiments. The method 2000 may be performed by a device, apparatus, or system for digital asset valuation. The method 2000 may be performed by one or more components of the environment or system illustrated by FIGS. 1-3, such as one or more components of the service-side system 310. Depending on the implementation, the method 2000 may include additional, fewer, or alternative steps performed in various orders or in parallel.

Block 2010 includes obtaining a request for valuating a digital asset corresponding to a tangible asset, wherein information associated with the digital asset is stored in a blockchain. Block 2020 includes generating, based on the obtained request, a blockchain transaction for valuating the digital asset, wherein the blockchain transaction invokes a blockchain contract executable for determining value information associated with the digital asset. In some embodiments, the generating the blockchain transaction for valuating the digital asset comprises identifying, based on the obtained request, a blockchain contract associated with the blockchain that is executable for issuing the digital asset. In some embodiments, the blockchain transaction for valuating the digital asset comprises an identifier associated with the digital asset or an identifier associated with the blockchain contract executable for issuing the digital asset. In some embodiments, the blockchain transaction for valuating the digital asset comprises information associated with one or more characteristics of the tangible asset corresponding to the digital asset.

In some embodiments, the blockchain contract executable to determine value information associated with the digital asset is executable to identify information associated with one or more characteristics of the tangible asset corresponding to the digital asset, determine, based on the one or more characteristics of the tangible asset, one or more other digital assets corresponding to one or more other tangible assets, respectively, wherein the one or more other tangible assets have characteristics similar to the one or more characteristics of the tangible asset corresponding to the digital asset, and determine value information associated with the digital asset based on the determined one or more other digital assets. In some embodiments, the one or more characteristics of the tangible asset comprise a quantity of the tangible asset, a size of the tangible asset, an appearance of the tangible asset, a timeframe associated with creation of the tangible asset, a creator of the tangible asset, or a condition of the tangible asset.

Block 2030 includes sending the blockchain transaction to a blockchain node associated with the blockchain for adding to the blockchain. Block 2040 includes obtaining, from the blockchain, the value information associated with the digital asset. In some embodiments, the value information associated with the digital asset comprises an identifier corresponding to one of the one or more other digital assets and an estimated ratio between the value of the digital asset and a value of the one other digital asset. In some embodiments, the value information associated with the digital asset comprises a weight associated with a value of each of the one or more other digital assets.

In some embodiments, the method further comprises determining an estimated value of the digital asset based on the value information obtained from the blockchain and sending the estimated value of the digital asset to a sender of the request for valuating the digital asset. In some embodiments, the determining the estimated value associated with the digital asset comprises retrieving, from the value information obtained from the blockchain, information associated with one or more other digital assets determined to be similar to the digital asset, obtaining one or more valuations for the one or more other digital assets, respectively, and determining the estimated value associated with the digital asset based on the obtained one or more valuations for the one or more other digital assets. In some embodiments, the determining the estimated value associated with the digital asset comprises calculating a weighted average of the obtained one or more valuations for the one or more other digital assets. In some embodiments, the determining the estimated value associated with the digital asset comprises adjusting one of the one or more valuations for one of the one or more other digital assets based on a comparison between a condition of the tangible asset corresponding to the digital asset and a condition of a tangible asset corresponding to the one of the one or more other digital assets.

Figure 21:
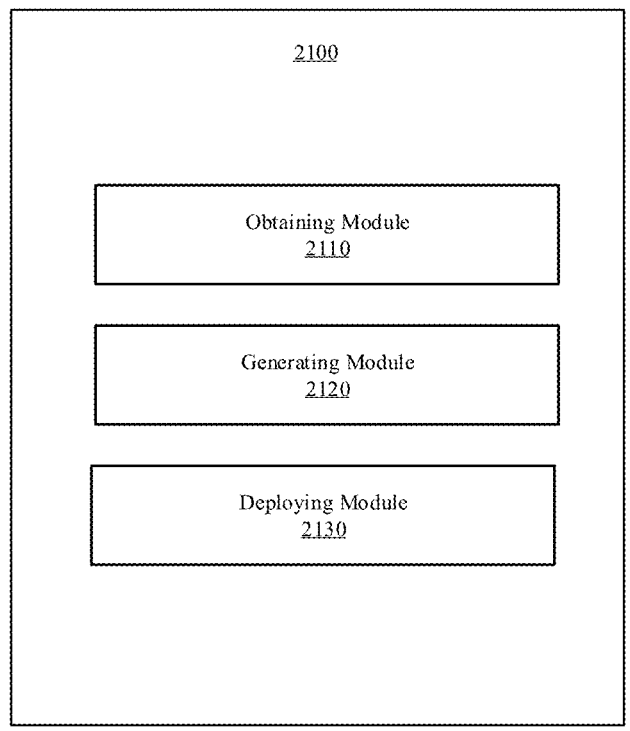
FIG. 21 illustrates a block diagram of a computer system for creating a digital asset in accordance with some embodiments.

FIG. 21 illustrates a block diagram of a computer system for creating a digital asset in accordance with some embodiments. The system 2100 may be an example of an implementation of one or more components of the service-side system 310 of FIG. 3 or one or more other components illustrated in FIGS. 1-3. The method 1700 may be implemented by the computer system 2100. The computer system 2100 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 1700. The computer system 2100 may comprise various units/modules corresponding to the instructions (e.g., software instructions). In some embodiments, the computer system 2100 may be referred to as an apparatus for digital asset management. The apparatus may comprise an obtaining module 2110 for obtaining a request for creating a digital asset corresponding to a tangible asset, wherein the request comprises one or more characteristics of the digital asset; a generating module 2120 for generating a blockchain contract corresponding to the tangible asset based on the one or more characteristics of the digital asset; and a deploying module 2130 for deploying the generated blockchain contract on a blockchain, wherein the deployed blockchain contract is executable to issue the digital asset corresponding to the tangible asset.

Figure 22:
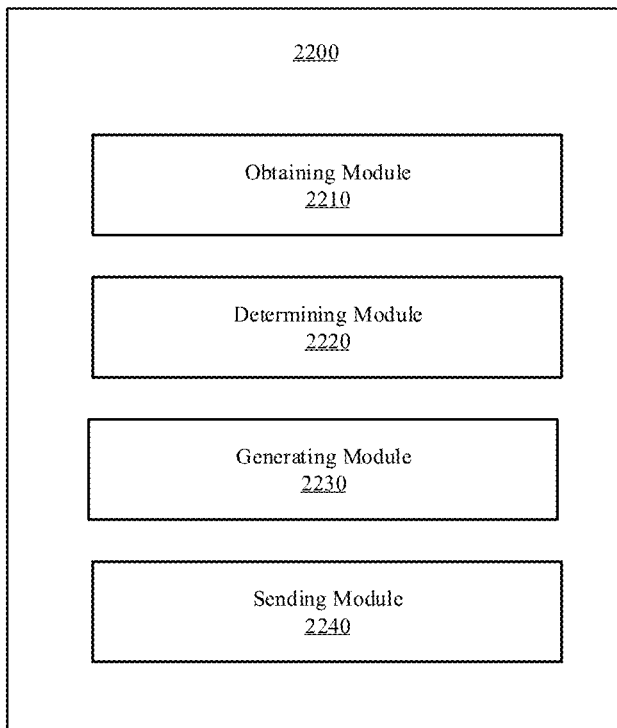
FIG. 22 illustrates a block diagram of a computer system for transferring a digital asset in accordance with some embodiments.

FIG. 22 illustrates a block diagram of a computer system for transferring a digital asset in accordance with some embodiments. The system 2200 may be an example of an implementation of one or more components of the service-side system 310 of FIG. 3 or one or more other components illustrated in FIGS. 1-3. The method 1800 may be implemented by the computer system 2200. The computer system 2200 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 1800. The computer system 2200 may comprise various units/modules corresponding to the instructions (e.g., software instructions). In some embodiments, the computer system 2200 may be referred to as an apparatus for digital asset transfer. The apparatus may comprise an obtaining module 2210 for obtaining a request for transferring a quantity of a digital asset from a first blockchain account associated with a blockchain to a second blockchain account associated with the blockchain, wherein the request identifies a tangible asset corresponding to the digital asset; a determining module 2220 for determining a blockchain contract that is deployed on the blockchain and that corresponds to the tangible asset identified in the request; a generating module 2230 for generating, based on the obtained request, a blockchain transaction for transferring the quantity of the digital asset from the first blockchain account to the second blockchain account, wherein the blockchain transaction invokes the determined blockchain contract; and a sending module 2240 for sending the generated blockchain transaction to a blockchain node for adding to the blockchain.

Figure 23:
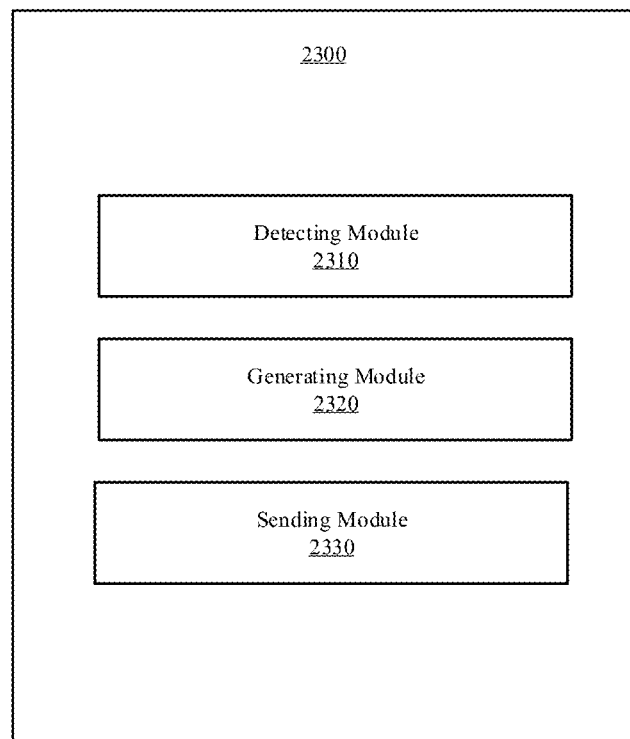
FIG. 23 illustrates a block diagram of a computer system for derestricting a digital asset in accordance with some embodiments.

FIG. 23 illustrates a block diagram of a computer system for derestricting a digital asset in accordance with some embodiments. The system 2300 may be an example of an implementation of one or more components of the service-side system 310 of FIG. 3 or one or more other components illustrated in FIGS. 1-3. The method 1900 may be implemented by the computer system 2300. The computer system 2300 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 1900. The computer system 2300 may comprise various units/modules corresponding to the instructions (e.g., software instructions). In some embodiments, the computer system 2300 may be referred to as an apparatus for controlling restrictions on digital asset. The apparatus may comprise a detecting module 2310 for detecting a triggering event for derestricting a quantity of a digital asset associated with a tangible asset, wherein the tangible asset corresponds to a blockchain contract deployed on a blockchain; a generating module 2320 for generating a blockchain transaction for transferring the quantity of the digital asset from a restricted blockchain account associated with the blockchain to an unrestricted blockchain account associated with the blockchain, wherein the blockchain transaction invokes the blockchain contract corresponding to the tangible asset; and a sending module 2330 for sending the blockchain transaction to a blockchain node for adding to the blockchain.

Figure 24:
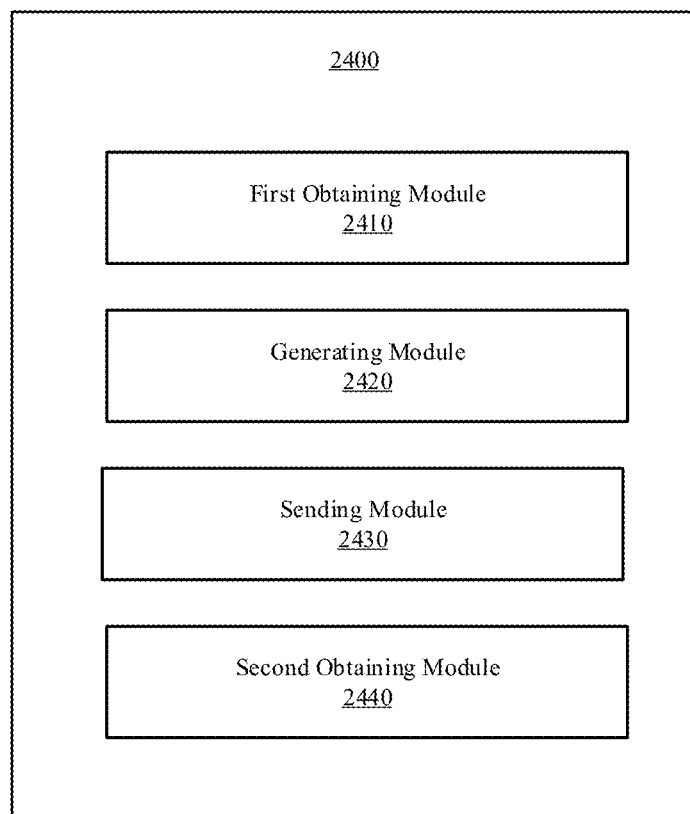
FIG. 24 illustrates a block diagram of a computer system for valuating a digital asset in accordance with some embodiments.

FIG. 24 illustrates a block diagram of a computer system for valuating a digital asset in accordance with some embodiments. The system 2400 may be an example of an implementation of one or more components of the service-side system 310 of FIG. 3 or one or more other components illustrated in FIGS. 1-3. The method 2000 may be implemented by the computer system 2400. The computer system 2400 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 2000. The computer system 2400 may comprise various units/modules corresponding to the instructions (e.g., software instructions). In some embodiments, the computer system 2400 may be referred to as an apparatus for digital asset valuation. The apparatus may comprise a first obtaining module 2410 for obtaining a request for valuating a digital asset corresponding to a tangible asset, wherein information associated with the digital asset is stored in a blockchain; a generating module 2420 for generating, based on the obtained request, a blockchain transaction for valuating the digital asset, wherein the blockchain transaction invokes a blockchain contract executable for determining value information associated with the digital asset; a sending module 2430 for sending the blockchain transaction to a blockchain node associated with the blockchain for adding to the blockchain; and a second obtaining module 2440 for obtaining, from the blockchain, the value information associated with the digital asset.

Figure 25:
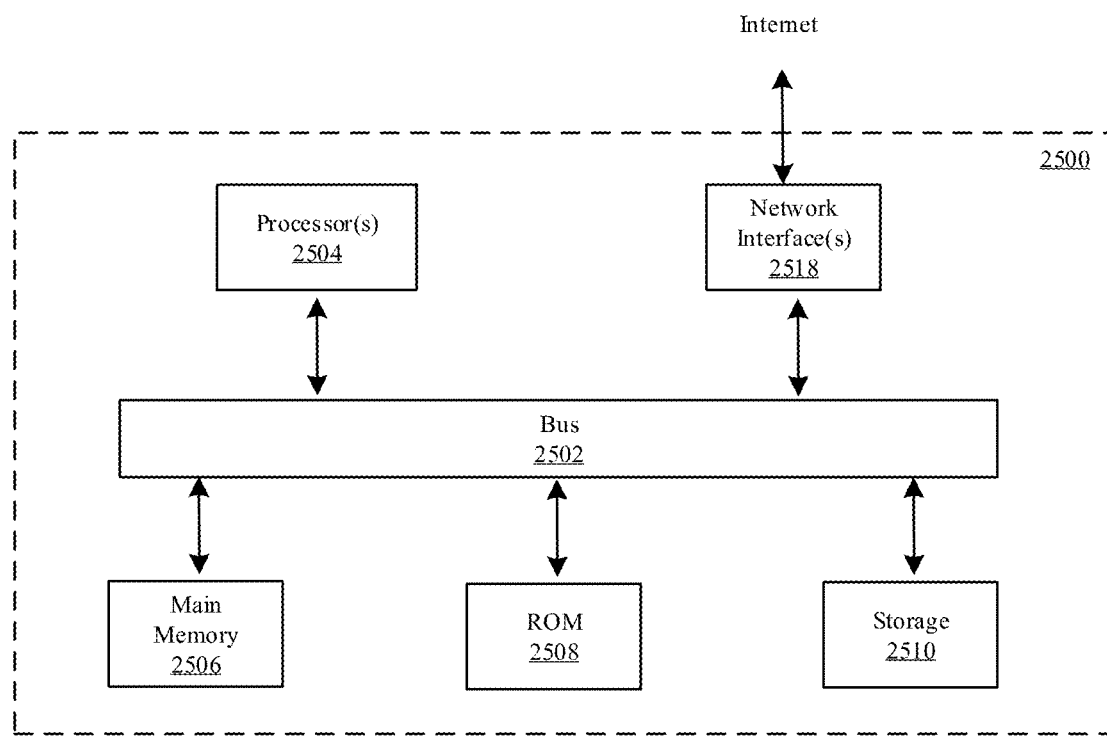
FIG. 25 illustrates a block diagram of a computer system in which any of the embodiments described herein may be implemented.

FIG. 25 illustrates a block diagram of a computer system in which any of the embodiments described herein may be implemented. The system 2500 may be implemented in any of the components of the environments or systems illustrated in FIGS. 1-3, such as one or more components of the service-side system 310, one or more components of the user-side system 340, or one or more blockchain nodes of the blockchain system 330. the software applications or services illustrated in FIGS. 1-3 may be implemented and operated on the system 2500. One or more of the example methods and operations illustrated by FIGS. 4-20 may be performed by one or more implementations of the computer system 2500.

The computer system 2500 may include a bus 2502 or other communication mechanism for communicating information, one or more hardware processor(s) 2504 coupled with bus 2502 for processing information. Hardware processor(s) 2504 may be, for example, one or more general purpose microprocessors.

The computer system 2500 may also include a main memory 2506, such as a random-access memory (RAM), cache and/or other dynamic storage devices, coupled to bus 2502 for storing information and instructions executable by processor(s) 2504. Main memory 2506 also may be used for storing temporary variables or other intermediate information during execution of instructions executable by processor(s) 2504. Such instructions, when stored in storage media accessible to processor(s) 2504, render computer system 2500 into a special-purpose machine that is customized to perform the operations specified in the instructions. The computer system 2500 may further include a read only memory (ROM) 2508 or other static storage device coupled to bus 2502 for storing static information and instructions for processor(s) 2504. A storage device 2510, such as a magnetic disk, optical disk, or USB thumb drive (Flash drive), etc., may be provided and coupled to bus 2502 for storing information and instructions.

The computer system 2500 may implement the techniques described herein using customized hard-wired logic, one or more ASICs or FPGAs, firmware and/or program logic which in combination with the computer system causes or programs computer system 2500 to be a special-purpose machine. According to one embodiment, the operations, methods, and processes described herein are performed by computer system 2500 in response to processor(s) 2504 executing one or more sequences of one or more instructions contained in main memory 2506. Such instructions may be read into main memory 2506 from another storage medium, such as storage device 2510. Execution of the sequences of instructions contained in main memory 2506 may cause processor(s) 2504 to perform the process steps described herein. In alternative embodiments, hard-wired circuitry may be used in place of or in combination with software instructions.

The main memory 2506, the ROM 2508, and/or the storage device 2510 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 2510. Volatile media includes dynamic memory, such as main memory 2506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 2500 may include a network interface 2518 coupled to bus 2502. Network interface 2518 may provide a two-way data communication coupling to one or more network links that are connected to one or more local networks. For example, network interface 2518 may be an integrated services digital network (ISDN) card, cable modem, satellite modem, or a modem to provide a data communication connection to a corresponding type of telephone line. As another example, network interface 2518 may be a local area network (LAN) card to provide a data communication connection to a compatible LAN (or WAN component to communicate with a WAN). Wireless links may also be implemented. In any such implementation, network interface 2518 may send and receive electrical, electromagnetic or optical signals that carry digital data streams representing various types of information.

The computer system 2500 can send messages and receive data, including program code, through the network(s), network link and network interface 2518. In the Internet example, a server might transmit a requested code for an application program through the Internet, the ISP, the local network and the network interface 2518.

The received code may be executed by processor(s) 2504 as it is received, and/or stored in storage device 2510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned. In addition, herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The invention claimed is:

1. A computer-implemented method for digital asset transfer, comprising:
   obtaining a request for transferring a quantity of a digital asset from a first blockchain account associated with a blockchain to a second blockchain account associated with the blockchain, wherein the request identifies a tangible asset corresponding to the digital asset;
   determining a blockchain contract that is deployed on the blockchain and that corresponds to the tangible asset identified in the request;
   generating, based on the obtained request, a first blockchain transaction for transferring the quantity of the digital asset from the first blockchain account to the second blockchain account, wherein the first blockchain transaction invokes the determined blockchain contract;
   sending the first blockchain transaction to a blockchain node for adding to the blockchain;
   obtaining a request for reversing the first blockchain transaction;
   generating, based on the obtained request for reversing the first blockchain transaction, a second blockchain transaction for transferring the quantity of the digital asset from the second blockchain account to the first blockchain account; and
   sending the second blockchain transaction to a blockchain node for adding to the blockchain.

2. The method of claim 1, wherein the first blockchain transaction comprises:
   an identifier associated with the blockchain contract;
   an identifier associated with the first blockchain account;
   an identifier associated with the second blockchain account; or
   the quantity of the digital asset to be transferred.

3. The method of claim 1, further comprising, before generating the first blockchain transaction:
   determining, based on the obtained request, one or more permissions associated with a sender of the request for transferring the digital asset; and
   verifying that the permissions associated with the sender satisfy one or more required permissions for transferring the digital asset from the first blockchain account to the second blockchain account.

4. The method of claim 1, further comprising, before generating the first blockchain transaction:
   obtaining, from the blockchain, data associated with the first blockchain account;
   determining, based on the obtained data, a quantity of the digital asset in the first blockchain account; and
   verifying that the determined quantity of the digital asset in the first blockchain account is no less than the quantity of the digital asset to be transferred.

5. The method of claim 1, further comprising, before generating the first blockchain transaction:
   determining, based on the blockchain contract, one or more required permissions for transferring the digital asset; and
   determining, based on the obtained request, that transferring the digital asset from the first blockchain account to the second blockchain account satisfies the one or more required permissions.

6. The method of claim 1, further comprising, before generating the first blockchain transaction:
   obtaining, from the request, a proof that an entity associated with the first blockchain account approved the transfer of the digital asset.

7. The method of claim 1, further comprising, before obtaining the request for transferring the quantity of the digital asset from the first blockchain account to the second blockchain account:
   generating a blockchain transaction for issuing a quantity of the digital asset to the first blockchain account, wherein the blockchain transaction for issuing the digital asset invokes the blockchain contract; and
   sending the blockchain transaction for issuing the digital asset to a blockchain node for adding to the blockchain.

8. The method of claim 1, further comprising:
   obtaining a request for buying back the transferred digital asset from the first blockchain account;
   generating a blockchain transaction for transferring the transferred digital asset from the first blockchain account to a buy-back blockchain account associated with the blockchain, wherein the blockchain contract comprises a restriction prohibiting transfer of the digital asset out of the buy-back blockchain account; and
   sending, to a blockchain node for adding to the blockchain, the blockchain transaction for transferring the transferred digital asset from the first blockchain account to the buy-back blockchain account.

9. The method of claim 1, further comprising:
   obtaining one or more blocks of the blockchain;
   extracting, from the obtained one or more blocks, one or more blockchain transactions invoking the blockchain contract; and
   determining a transaction history associated with the digital asset based on the one or more extracted blockchain transactions.

10. The method of claim 1, further comprising:
    obtaining one or more blocks of the blockchain;
    extracting, from the obtained one or more blocks, one or more blockchain transactions associated with the first blockchain account; and
    determining a transaction history associated with the first blockchain account based on the one or more extracted blockchain transactions.

11. The method of claim 1, further comprising:
    locally storing information associated with the first blockchain transaction or the second blockchain transaction.

12. The method of claim 1, further comprising, before generating the first blockchain transaction:
    querying for any restriction placed on the first blockchain account or the second blockchain account; and
    verifying that transferring the quantity of the digital asset from the first blockchain account to the second blockchain account is not prohibited by any restriction placed on the first blockchain account or the second blockchain account.

13. The method of claim 1, further comprising, before generating the first blockchain transaction:
    querying for any restriction placed on the digital asset; and
    verifying that transferring the quantity of the digital asset from the first blockchain account to the second blockchain account is not prohibited by any restriction placed on the digital asset.

14. A non-transitory computer-readable storage medium for digital asset transfer, configured with instructions executable by one or more processors to cause the one or more processors to perform operations comprising:
    obtaining a request for transferring a quantity of a digital asset from a first blockchain account associated with a blockchain to a second blockchain account associated with the blockchain, wherein the request identifies a tangible asset corresponding to the digital asset;
    determining a blockchain contract that is deployed on the blockchain and that corresponds to the tangible asset identified in the request;
    generating, based on the obtained request, a first blockchain transaction for transferring the quantity of the digital asset from the first blockchain account to the second blockchain account, wherein the first blockchain transaction invokes the determined blockchain contract;
    sending the first blockchain transaction to a blockchain node for adding to the blockchain;
    obtaining a request for reversing the first blockchain transaction;
    generating, based on the obtained request for reversing the first blockchain transaction, a second blockchain transaction for transferring the quantity of the digital asset from the second blockchain account to the first blockchain account; and
    sending the second blockchain transaction to a blockchain node for adding to the blockchain.

15. The non-transitory computer-readable storage medium of claim 14, wherein the first blockchain transaction comprises:
    an identifier associated with the blockchain contract;
    an identifier associated with the first blockchain account;
    an identifier associated with the second blockchain account; or
    the quantity of the digital asset to be transferred.

16. The non-transitory computer-readable storage medium of claim 14, wherein the operations further comprise, before generating the first blockchain transaction:
- determining, based on the obtained request, one or more permissions associated with a sender of the request for transferring the digital asset; and
- verifying that the permissions associated with the sender satisfy one or more required permissions for transferring the digital asset from the first blockchain account to the second blockchain account.

17. The non-transitory computer-readable storage medium of claim 14, wherein the operations further comprise, before generating the first blockchain transaction:
- obtaining, from the blockchain, data associated with the first blockchain account;
- determining, based on the obtained data, a quantity of the digital asset in the first blockchain account; and
- verifying that the determined quantity of the digital asset in the first blockchain account is no less than the quantity of the digital asset to be transferred.

18. The non-transitory computer-readable storage medium of claim 14, wherein the operations further comprise, before generating the first blockchain transaction:
- determining, based on the blockchain contract, one or more required permissions for transferring the digital asset; and
- determining, based on the obtained request, that transferring the digital asset from the first blockchain account to the second blockchain account satisfies the one or more required permissions.

19. A system for digital asset transfer, comprising a processor and a non-transitory computer-readable storage medium storing instructions executable by the processor to cause the system to:
- obtain a request for transferring a quantity of a digital asset from a first blockchain account associated with a blockchain to a second blockchain account associated with the blockchain, wherein the request identifies a tangible asset corresponding to the digital asset;
- determine a blockchain contract that is deployed on the blockchain and that corresponds to the tangible asset identified in the request;
- generate, based on the obtained request, a first blockchain transaction for transferring the quantity of the digital asset from the first blockchain account to the second blockchain account, wherein the first blockchain transaction invokes the determined blockchain contract;
- send the first blockchain transaction to a blockchain node for adding to the blockchain;
- obtaining a request for reversing the first blockchain transaction;
- generating, based on the obtained request for reversing the first blockchain transaction, a second blockchain transaction for transferring the quantity of the digital asset from the second blockchain account to the first blockchain account; and
- sending the second blockchain transaction to a blockchain node for adding to the blockchain.

20. The non-transitory computer-readable storage medium of claim 14, wherein the operations further comprise, before generating the first blockchain transaction:
- obtaining, from the request, a proof that an entity associated with the first blockchain account approved the transfer of the digital asset.

* * * * *